United States Patent
Chan et al.

(10) Patent No.: US 11,449,925 B2
(45) Date of Patent: Sep. 20, 2022

(54) SYSTEMS AND METHODS FOR ORDERING GRAPHICAL USER INTERFACE

(71) Applicant: TACO BELL CORP., Irvine, CA (US)

(72) Inventors: Derrick Chan, Tustin, CA (US); Jenna Keith-Birney, Newport Beach, CA (US); Veronica Luna, Anaheim, CA (US); Manisha Dhawan, Irvine, CA (US); Berenguer O. Duncan, Seattle, WA (US); Lance Lockett, Seattle, WA (US); Brynn Dirksen, Portland, OR (US); Colin Howarth, Pacifica, CA (US); Chris DeGroff, Apex, NC (US); Jonathan Maier, Austin, TX (US)

(73) Assignee: Taco Bell Corp., Irvine, CA (US)

( * ) Notice: Subject to any disclaimer, the term of this patent is extended or adjusted under 35 U.S.C. 154(b) by 42 days.

(21) Appl. No.: 16/252,494

(22) Filed: Jan. 18, 2019

(65) Prior Publication Data

US 2019/0228463 A1 Jul. 25, 2019

Related U.S. Application Data

(60) Provisional application No. 62/620,242, filed on Jan. 22, 2018.

(51) Int. Cl.
*G06Q 30/06* (2012.01)
*G06F 3/0488* (2013.01)
*G06Q 50/12* (2012.01)

(52) U.S. Cl.
CPC ....... *G06Q 30/0641* (2013.01); *G06F 3/0488* (2013.01); *G06Q 30/0621* (2013.01); *G06Q 30/0639* (2013.01); *G06Q 50/12* (2013.01)

(58) Field of Classification Search
CPC .......... G06Q 30/0641; G06Q 30/0621; G06Q 30/0639; G06Q 50/12; G06F 3/0488
See application file for complete search history.

(56) References Cited

U.S. PATENT DOCUMENTS

| 7,835,946 B2 * | 11/2010 | Goren | G06Q 40/04 705/26.7 |
| 9,009,067 B1 * | 4/2015 | Scotto | G06Q 30/0635 705/37 |

(Continued)

FOREIGN PATENT DOCUMENTS

| CA | 2976615 A1 * | 12/2016 | ........ G06Q 10/0833 |
| WO | WO-2014164403 A1 * | 10/2014 | ........... G06F 1/1694 |
| WO | WO-2018163044 A1 * | 9/2018 | ........ G06F 16/2315 |

OTHER PUBLICATIONS

N. A. Samsudin, S. K. Ahmad Khalid, M. F. A. Mohd Kohar, Z. Senin and M. N. Ihkasan, "A customizable wireless food ordering system with realtime customer feedback," 2011 IEEE Symposium on Wireless Technology and Applications (ISWTA), 2011, pp. 186-191, doi: 10.1109/ISWTA.2011.6089405. (Year: 2011).*

(Continued)

*Primary Examiner* — Ashford S Hayles
(74) *Attorney, Agent, or Firm* — Knobbe, Martens, Olson & Bear, LLP

(57) ABSTRACT

An ordering system described herein can include a rapid reorder of items without needing to re-add the individual items into a shopping cart. The rapid reorder may be triggered via a 3D touch or a long press on a mobile device. The ordering system can also provide an architecture that can allow a user to modify an order, such as, e.g., the pickup time or store location, after the order has been submitted.

20 Claims, 17 Drawing Sheets

(56) References Cited

U.S. PATENT DOCUMENTS

| | | | | |
|---|---|---|---|---|
| 9,965,797 | B1* | 5/2018 | Poole | G06Q 30/0639 |
| 10,162,452 | B2* | 12/2018 | Westerman | G06F 3/04166 |
| 10,437,333 | B2* | 10/2019 | Bernstein | G06F 3/016 |
| 10,467,559 | B1* | 11/2019 | Svenson | G06Q 20/209 |
| 10,620,780 | B2* | 4/2020 | Chaudhri | G06F 3/016 |
| 10,650,437 | B2* | 5/2020 | Tsao | G06Q 30/0643 |
| 10,776,762 | B2* | 9/2020 | Sarin | G06F 3/04883 |
| 2003/0018536 | A1* | 1/2003 | Eggebraaten | G06Q 30/0635 |
| | | | | 705/26.81 |
| 2006/0178943 | A1* | 8/2006 | Rollinson | G06Q 30/0601 |
| | | | | 705/26.1 |
| 2007/0073586 | A1* | 3/2007 | Dev | G06Q 30/0224 |
| | | | | 705/26.1 |
| 2009/0184933 | A1* | 7/2009 | Wei-Wen | G06F 3/04886 |
| | | | | 345/173 |
| 2010/0066698 | A1* | 3/2010 | Seo | G06F 9/4843 |
| | | | | 715/761 |
| 2011/0258058 | A1* | 10/2011 | Carroll | G06Q 30/06 |
| | | | | 705/15 |
| 2013/0057483 | A1* | 3/2013 | Peng | G06F 3/0416 |
| | | | | 345/173 |
| 2013/0130208 | A1* | 5/2013 | Riscalla | G06Q 30/0621 |
| | | | | 434/127 |
| 2013/0201215 | A1* | 8/2013 | Martellaro | G06F 3/048 |
| | | | | 345/633 |
| 2013/0212529 | A1* | 8/2013 | Amarnath | G06F 3/017 |
| | | | | 715/810 |
| 2013/0238451 | A1* | 9/2013 | Riscalla | G06Q 50/12 |
| | | | | 705/15 |
| 2013/0317921 | A1* | 11/2013 | Havas | G06Q 20/20 |
| | | | | 705/15 |
| 2014/0095994 | A1* | 4/2014 | Kim | G06F 3/016 |
| | | | | 715/702 |
| 2014/0136348 | A1* | 5/2014 | Carroll | G06Q 50/12 |
| | | | | 705/15 |
| 2014/0337149 | A1* | 11/2014 | Ke | G06F 3/0346 |
| | | | | 705/26.81 |
| 2015/0006314 | A1* | 1/2015 | Goulart | G06Q 30/0641 |
| | | | | 705/26.7 |
| 2015/0025983 | A1* | 1/2015 | Cicerchi | G06Q 30/0633 |
| | | | | 705/15 |
| 2015/0213565 | A1* | 7/2015 | Garrett | G06Q 20/3224 |
| | | | | 705/15 |
| 2015/0269687 | A1* | 9/2015 | Dempski | G06Q 50/12 |
| | | | | 705/15 |
| 2016/0018984 | A1* | 1/2016 | Choi | G06F 3/0482 |
| | | | | 715/863 |
| 2016/0062636 | A1* | 3/2016 | Jung | G06F 3/04817 |
| | | | | 715/762 |
| 2016/0117762 | A1* | 4/2016 | Ahmad | G06Q 50/12 |
| | | | | 705/15 |
| 2016/0244311 | A1* | 8/2016 | Burks | B67D 1/0888 |
| 2016/0259413 | A1* | 9/2016 | Anzures | G06F 3/0481 |
| 2016/0350838 | A1* | 12/2016 | Tsao | G06Q 30/0643 |
| 2016/0358235 | A1 | 12/2016 | De Langis | |
| 2017/0046773 | A1* | 2/2017 | Hendricks, II | G06Q 30/0635 |
| 2017/0308818 | A1* | 10/2017 | Almishari | G06Q 10/02 |
| 2018/0088795 | A1* | 3/2018 | Van Os | G06F 1/3206 |
| 2019/0108601 | A1* | 4/2019 | Ke | G06Q 30/0635 |

OTHER PUBLICATIONS

Soon Nyean Cheong, Wei Wing Chiew and Wen Jiun Yap, "Design and development of Multi-touchable E-restaurant Management System," 2010 International Conference on Science and Social Research (CSSR 2010), 2010, pp. 680-685, doi: 10.1109/CSSR.2010.5773867. (Year: 2010).*

DelivrMe: Mobile Food-Delivery Application, An IP.com Prior Art Database Technical Disclosure, Authors et. al.: Disclosed Anonymously, IP.com No. IPCOM000225225D (Year: 2013).*

BW CI World, Swiggy's Revamped App Makes It Faster and Easier to Order Meal of Your Choice, http://bwcio.businessworld.in/article/Swiggy-s-Revamped-App-Makes-lt-Faster-and-Easier-to-Order-Meal-of-Your-Choice/24/07/2017-122656/, printed Sep. 18, 2018 (4 pgs).

Smart-Resto, Online Food Ordering System, https://www.smartresto.in/2018/04/18/online-food-ordering-system/, printed Sep. 19, 2018 (4 pgs).

TechCrunch, Half of Amazon app users have been switched to a new, swipe-based 1-Click checkout, Archived Jan. 1, 2018 to https://web.archive.org/web/20180101214007/https://techcrunch.com/2017/12/13/half-of-amazon-app-users-have-been-switched-to-a-new-swipe-based-1-click-checkout/ (4 pgs).

OROCommerce, Feature Highlight: Improved Reordering and Quick Order Capabilities in OroCommerce, https://oroinc.com/b2b-ecommerce/blog/feature-highlight-improved-reordering-quick-order-capabilities-orocommerce, printed Sep. 19, 2018 (7 pgs).

* cited by examiner

SYSTEMS AND METHODS FOR ORDERING GRAPHICAL USER INTERFACE

INCORPORATION BY REFERENCE TO ANY PRIORITY APPLICATIONS

This application claims benefit of U.S. Provisional Patent Application Ser. No. 62/620,242 entitled "Methods and Architectures for an Online Ordering System" filed Jan. 22, 2018, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

Restaurant ordering and management have persisted in the face of widespread computerization. For example, a company can provide a website or mobile application which can include a menu from which the user can select an item, add the item to a virtual shopping cart, proceed to a checkout page, and submit the order. The company can review the submitted order and begin fulfilling the order.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a system for rapid reordering is disclosed comprising: a non-transitory physical computer storage that stores executable instructions corresponding to an ordering application; and a hardware processor programmed to execute the instructions so as to: determine that a user is authenticated by the ordering application; detect a first actuation of a mobile device, wherein the first actuation comprises a 3D touch or a long press on a display of the mobile device; cause the mobile device to present an option for a rapid reorder of an item in response to the detection of the first actuation of the mobile device and in response to the determination that the user is authenticated; detect a second actuation of the mobile device, wherein the second actuation indicates a selection of the option for the rapid reorder; in response to the detection of the second actuation, activate the ordering application from a background process, access order information associated with the item, and cause the mobile device to present a checkout user interface of the ordering application, wherein the checkout user interface comprises the order information associated with the item; and communicate first data to a remote computing system, the first data comprising a request to create an order object by the remote computing system based at least partly on the order information.

According to an aspect, the order information associated with the item may comprise a customization of the item.

According to another aspect, the order information may comprise a pickup location of the item.

According to yet another aspect, the hardware processor can be further programmed to: receive an indication that the user selected a check-in action; and in response to receiving the indication, update a status associated with the order object from a first status to a second status.

According to yet another aspect, the hardware processor can be further programmed to: cause the mobile device to present a user interface for enabling and configuring a second rapid reorder for a second item.

According to yet another aspect, the order object may comprise an order that is on a past order list or a favorite order list.

According to another embodiment, a method for rapid reordering is disclosed comprising: under control of a hardware processor, detecting a first actuation of a mobile device wherein the first actuation comprises a 3D touch or a long press on a display of the mobile device; causing the mobile device to present an option for a rapid reorder of an item in response to the first actuation of the mobile device; detecting a second actuation of the mobile device, wherein the second actuation indicates a selection of the option for the rapid reorder; activating an ordering application on the mobile device; determining that the rapid reorder is configured for the item; in response to the determination that the rapid reorder is configured for the item; accessing order information associated with the item; causing the mobile device to present a checkout user interface of the ordering application, wherein the checkout user interface comprises the order information associated with the item; and communicating first data to a remote computing system, the first data comprising a request to create an order by the remote computing system based at least partly on the order information.

According to an aspect, the method may further comprise: determining that a user is authenticated by the ordering application; and wherein the option for rapid reorder is presented in response to the determination that the user is authenticated by the ordering application and the detection of the first actuation of the mobile device.

According to another aspect, the method may further comprise: causing the mobile device to present a user interface for enabling and configuring a second rapid reorder for a second item.

According to yet another aspect, the order information associated with the item may comprise a customization of the item.

According to yet another aspect, the order information may comprise a pickup location of the item.

According to yet another aspect, the method may further comprise: receiving an indication that a user selected a check-in action; and in response to receiving the indication, updating a status associated with the request to create the order.

According to yet another aspect, the order may comprise a past order or a favorite order.

According to yet another embodiment, a system for rapid reordering is disclosed comprising: a non-transitory physical computer storage that stores executable instructions corresponding to an ordering application; and a hardware processor programmed to execute the instructions so as to: detect a first actuation of a mobile device wherein the first actuation comprises a 3D touch or a long press on a display of the mobile device; cause the mobile device to present an option for a rapid reorder of an item in response to the first actuation of the mobile device; detect a second actuation of the mobile device, wherein the second actuation indicates a selection of the option for the rapid reorder; access order information associated with the item; cause the mobile device to present a checkout user interface of the ordering application, wherein the checkout user interface comprises the order information associated with the item; and communicate first data to a remote computing system, the first data comprising a request to create an order by the remote computing system based at least partly on the order information.

According to an aspect, the hardware processor can be further programmed to: determine that that a user is authenticated by the ordering application; and wherein the option for rapid reorder is presented in response to the determination that the user is authenticated by the ordering application and the detection of the first actuation of the mobile device.

According to another aspect, the hardware processor can be further programmed to: cause the mobile device to present a user interface for enabling and configuring a second rapid reorder for a second item.

According to yet another aspect, the order information associated with the item may comprise a customization of the item.

According to yet another aspect, the order information may comprise a pickup location of the item.

According to yet another aspect, the hardware processor can be further programmed to: receive an indication that a user selected a check-in action; and update a status associated with the request to create the order.

According to yet another aspect, the order may comprise a past order or a favorite order.

According to yet another embodiment, a system for configuring an order for rapid reordering is disclosed comprising: an online ordering platform comprising a plurality of servers that host at least a portion of an online ordering application; and one or more hardware processors of the online ordering platform programmed to: receive a request to configure a rapid reorder for a first order object comprising data representing an item previously ordered by a user; communicate order information of the first order object to a backend processing system; receive an indication from the backend processing system that the item is available at a store location selected by the user or within an area having geographic proximity to the user; subsequent to receiving the indication: activate the rapid reorder for the first order object; determine whether the rapid reorder was previously configured for a second order object; automatically disable the rapid reorder for the second order object; and cause a user device associated with the user to present a user interface indicating that the rapid reorder is enabled for the first order object.

According to an aspect, the first order object may comprise an order that is on a past order list or a favorite order list.

According to another aspect, the hardware processor can be further programmed to: determine whether an order identified in the first order object is part of the favorite order list; and in response to a determination that the order is not part of the favorite order list, automatically add the order to the favorite order list.

According to yet another aspect, the hardware processor can be further programmed to: receive an indication for placing an order for the item via the rapid reorder; and in response to the indication, cause the user device to render a checkout user interface comprising the order information for the first order object.

According to yet another aspect, the first order object may comprise a first pickup location which is different from a second pickup location previously set for the rapid reorder, and wherein the one or more hardware processors can be further programmed to cause the rapid recorder to include the item in the first order object while keeping the second pickup location as the location for the rapid reorder.

According to yet another embodiment, a method for setting up an order for rapid reorder is disclosed comprising: receiving a request to configure a rapid reorder of an item for a user; determining an order object for the item; communicating order information of the order object to a backend processing system; receiving an indication from the backend processing system that the item is available at a store location selected by the user or within an area having geographic proximity to the user; subsequent to receiving the indication: activating the rapid reorder for the order object; causing a user device associated with the user to present an updated user interface indicating that rapid reorder is enabled for the order object; and automatically disabling the rapid reorder for another order object previously configured as the rapid reorder.

According to an aspect, the items are in a previously placed order or in a favorite order. According to another aspect, determining the order object may comprise creating the order object comprising the order information for the item.

According to yet another aspect, the method may further comprise: determining whether an order identified in the order object is part of a favorite order list; and in response to a determination that the order is not part of the favorite order list, automatically adding the order to the favorite order list.

According to yet another aspect, the method may further comprise: receiving an indication for triggering the rapid reorder, wherein the indication for triggering the rapid reorder comprises a long press or a 3D touch on a display of a user device; and in response to receiving the indication, causing the user device to render a checkout user interface comprising the order information for the order object.

According to yet another aspect, the store may be selected for the rapid reorder prior to receiving the request to configure the rapid reorder for the items.

According to yet another embodiment, a system for managing an order after submission by a user device is disclosed comprising: an online ordering platform that communicates with a plurality of user devices and that hosts at least a portion of an online ordering application; a backend processing system that interfaces between the online ordering platform and one or more restaurant computer systems and that validates order information in an order object; and one or more hardware processors of the online ordering platform and the backend processing system, the one or more hardware processors programmed to: receive, by the online ordering platform, a first request for placing an order of an item and a first pickup location; create, by the backend processing system, the order object comprising the order information, wherein the order object is created based at least in part on information associated with the item and the first pickup location; communicate a first notification to the user device indicating that the order's status is received; receive, by the online ordering platform, a second request for changing the first pickup location to the second pickup location for the order after communicating the first notification; determine, by the backend processing system, that at the order information is compatible with the second pickup location; update the order object to be associated with the second pickup location instead of the first pickup location; and cause, by the backend processing system, the order information to be sent to a restaurant system associated with the second pickup location.

According to an aspect, the first pickup location may be associated with a first restaurant system and the second pickup location may be associated with a second restaurant system, the one or more hardware processors can cause the backend processing system to: set the order's status to cancelled and communicate a notification to the first restaurant system indicating that the order object is cancelled; create another order object which includes the information associated with the item and the second pickup location; and communicate order information in the other order object to the second restaurant system.

According to another aspect, the one or more hardware processors can be programmed to: in response to a determination that at least some order information in the order object is incompatible with the second pickup location, determine that an incompatibility can be remedied without an input from the user; and generate and communicate a first alert to the user device indicating that the order cannot be completed at the second pickup location in response to a determination that the incompatibility cannot be remedied.

According to yet another aspect, the one or more hardware processors can be programmed to: determine an alternative option for the order in response to a determination that the incompatibility can be remedied; and generate and communicate a second alert to the user device requesting a confirmation to update the first pickup location to the second pickup location with the alternative option for the order.

According to yet another aspect, to validate the order information, the one or more hardware processors can be further programmed to determine an availability of the item at the second pickup location.

According to yet another aspect, the one or more hardware processors can be further programmed to: determine that the second request is received after the order is being prepared by a store at the first pickup location; and cause the order information to be sent to the restaurant system associated with the second pickup location in response to a determination that the order has not yet been prepared.

According to yet another aspect, the one or more hardware processors can be further programmed to: determine that the second request is sent after the order is checked-in; and cause the order information to be sent to the restaurant system associated with the second pickup location in response to a determination that the order has not been checked-in.

According to yet another embodiment, a method for managing an order after submission by a user device is disclosed comprising: under control of a hardware processor, receiving a first request for placing an order of an item and a first pickup location; creating an order object with order information comprising at least partly information associated with the item and the first pickup location; communicating a first notification to the user device indicating that the order is received; receiving a second request for changing the first pickup location to the second pickup location for the order after communicating the first notification; determining that the order information is compatible with the second pickup location; and updating the order object to be associated with the second pickup location instead of the first pickup location; and causing the order information to be sent to a restaurant system associated with the second pickup location.

According to an aspect, the first pickup location may be associated with a first restaurant system and the second pickup location may be associated with a second restaurant system, the method further comprising: setting the order's status to cancelled and communicating a notification to the first restaurant system indicating that the order object is cancelled; creating another order object which includes the information associated with the item and the second pickup location; and communicating order information in the other order object to the second restaurant system.

According to another aspect, the method may further comprise: in response to a determination that at least some order information in the order object is incompatible with the second pickup location, determining whether an incompatibility can be remedied without an input from the user; and generating and communicating a first alert to the user device indicating that the order cannot be completed at the second pickup location in response to a determination that the incompatibility cannot be remedied.

According to yet another aspect, the method may further comprise: determining an alternative option for the order in response to a determination that the incompatibility can be remedied; and generating and communicating a second alert to the user device requesting a confirmation to update the first pickup location to the second pickup location with the alternative option for the order.

According to yet another aspect, validating the order information may further comprise determining an availability of the item at the second pickup location.

According to yet another aspect, the method may further comprise: determining whether the second request is received after the order is being prepared by a store at the first pickup location or after the order is checked-in; and causing the order information to be sent to the restaurant system associated with the second pickup location in response to a determination that the order has not yet been prepared or checked-in.

According to yet another embodiment, a system for managing an order after submission by a user device is disclosed comprising: an online ordering platform that hosts at least a portion of an online ordering application, the online ordering platform comprising a hardware processor programmed to: detect a check-in action corresponding to an order object; determine a current status of the order object; update the current status of the order object to checked-in in response to a determination that the order object is eligible for check in based on the current status; and communicate to a backend processing system that the current status of the order is updated to checked-in, wherein the backend processing system is an interface between the online ordering platform and one or more restaurant systems; and wherein the backend processing system is configured to: receive an update to the order status from the online ordering platform; update the current status of the order object as maintained by the backend processing system to checked-in; and provide an indication to a selected one of the one or more restaurant systems that the order object is checked-in, which causes the selected restaurant system to update the order status to being made which triggers a preparation of items in the order object.

According to an aspect, the order object may be eligible for check-in if the current status of the order object is received.

According to another aspect, the order object may be ineligible for check-in if the current status of the order object is checked-in, cancelled, or being made.

According to yet another aspect, the check-in action may be detected in response to a user action at an online ordering application or an input from the restaurant system.

According to yet another aspect, the backend processing system can further receive, from the selected restaurant system, that the order status is changed to being made; and wherein the backend processing system synchronizes with the online ordering platform to change the order status to being made.

According to yet another embodiment, a method for managing an order after submission by a user device is disclosed comprising: under control of a hardware processor, providing a first notification to a user device indicating that a submitted order is ready for check-in; detecting a check-in action of an order object associated with the submitted order; updating the current status of the order object to checked-in; providing an indication to a restaurant system that the order object is checked-in, which causes the restaurant system to update the order status to being made which triggers a preparation of items in the order object; synchronizing with the restaurant system to further update the current status of the order object to being made; and providing a second notification to the user device indicating that the current status of the order is changed to being made.

According to an aspect, the method may further comprise: receiving a response to the first notification wherein the responses comprising an extension of time; and automatically checking in the order object at the end of the extension.

According to another aspect, the method may further comprise: determining a closing time of a store associated with the order object, and providing an error message to the user system if the extension of time causes a pickup time of the order to go beyond the store's closing time.

According to yet another aspect, in response to a determination that no response is received for the first notification, the checking in of the order object can be automatically triggered after certain time duration.

According to yet another aspect, the method may further comprise: disabling a check-in option for the order object when the current status of the order object is changed to being made.

According to yet another aspect, the check-in action can be detected in response to a user action at an online ordering application or an input from the restaurant system.

Figure 1:
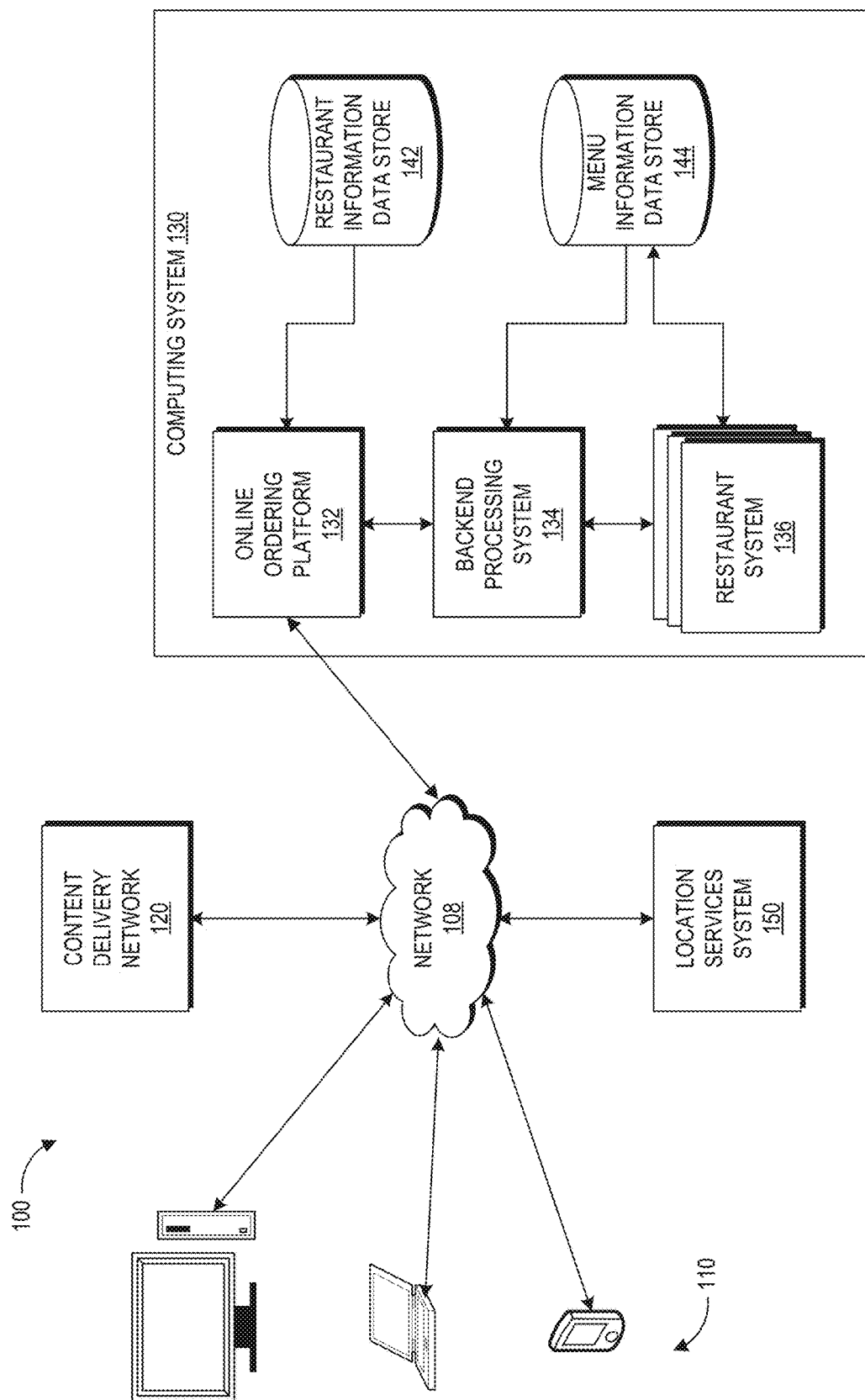
FIG. 1 illustrates an example computing environment of a restaurant ordering system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Although a user can place an order via some existing item ordering applications, the user often repeatedly purchases the same set of items. However, the user may need to re-add each individual item to a virtual shopping cart even though the items were previously ordered, which increases the user's burden and reduces interactivity of the ordering application. This problem becomes more serious in the restaurant industry because some users tend to repeatedly order the same set of food (e.g., soda, burger, and fries, etc.) as a combination order (or "combo"), as opposed to repeatedly ordering one item. Furthermore, a user may prefer to individually customize each food item (e.g., burger without onion), which is even more burdensome for users on repeat orders.

To ameliorate these problems, some ordering applications can allow a user to reorder an individual item from an order history or wish list. However, this design does not solve the problems unique to the restaurant industry as described above. Advantageously, in some embodiments, this disclosure describes embodiment of an online ordering application that can include a rapid reorder feature for a fast favorite order, among other features. The fast favorite order can include an item, a combination of items, customizations of one or more etc., which can allow a user to repeatedly place the same order without needing to re-add the same items into a shopping cart. Further, the rapid reorder may be triggered without needing to open a product page. For example, a user can trigger the rapid reorder via a particular actuation mechanism such as 3D touch available in Apple iOS™ devices, or a long press available in Android OS™ devices or other mobile devices, even though the application may be running as a background process on the mobile device and the user may not be actively interacting with the ordering application when the rapid reorder is triggered.

In addition, the ordering system described herein can provide an architecture in some embodiments, which can allow a user to modify an order, such as, e.g., by modifying the pickup time or store location, after the order has been submitted. Once the store location is updated, the ordering system may reapply a set of one or more validation rules to determine whether the updated store location is still capable of fulfilling the order.

In some situations, a user may want to delay the pickup time or pick up an order early. However, regardless of when the user arrives, existing restaurants may still prepare the order in accordance with the pickup time set previously, which may cause inefficient utilization of task scheduling and order processing. Advantageously, in some embodiments, the ordering system described herein can allow a user to check in after the order has been submitted. Upon checking in the order, the ordering system can send the order from a pending order queue to the kitchen system where the order is prepared, which can increase efficiency in order preparation and scheduling (which may be useful in at least the fast food industry where orders are often prepared in a time-sensitive manner). Prior to checking in, the order can stay in the pending order queue, and the store does not start preparing the order. The user can perform an early check-in, which may cause the order to be prepared earlier than the scheduled pickup time. The user can also delay the pickup time after submission of the order, which may cause the order to stay in the pending order queue for a longer period of time.

Example Computing Environment of an Online Ordering Application

FIG. 1 illustrates an example computing environment 100 of a restaurant ordering system. The example computing environment 100 in FIG. 1 includes one or more user systems 110, a location services system 150, a content delivery network 120 (which may be optional in some embodiments), and a computing system 130. The various elements in the example computing environment 100 can communicate with each other via a network 108. The network 108 can include one or more of local area network (LAN), wide area network (WAN), an Intranet, and/or the Internet, for example, via a wired, wireless, or combination of wired and wireless communication links. The various systems and components shown can be implemented by one or more physical and/or virtual servers, which may be geographically dispersed or co-located. Any of the components shown can be hosted in a cloud computing architecture or in a dedicated data center or centers.

In various embodiments, more or fewer elements can be included in the computer environment 100. As one example, the computing environment 100 may include one or more of a payment or gift card processing system, a big data analytics system which can analyze user behaviors and providing business intelligence, a social networking system that can allow a user to post activity associated with the online ordering application, a loyalty or rewards processing system, a ratings and reviews system, alone or in combination. One or more of these systems can also interface with the computing system 130 via the network 108. As another example, in some embodiments, the content delivery network 120 or the location services system 150 may be part of the computing system 130.

User System

The user system 110 (sometimes referred to herein as a user device or mobile device) can include various computing devices with a processor, such as, e.g., a smart phone, cell phone, tablet, phablet, laptop, television, game system, e-reader, desktop computer, audio assistant (such as an Amazon Echo™ or the like), or the like. An application (not shown) installed on the computing device can allow a user to interact with the computing system 130 via the network 108. The application can be a restaurant ordering application which can allow a user to place, edit, check in, or cancel an order at a restaurant via the network 108. The application can be a mobile application or native application (such as an iOS™ app or an Android™ app), a web browser, or a combination of the same.

The user system 110 (e.g., the application on the user system 110) can also communicate with a content delivery network 120 and a location services system 150 via the network 108. The user system 110 can request and receive information of the restaurant from the content delivery network 120. For example, the user system 110 can request and receive a menu, product images, videos, as well as other content from the content delivery network 120. In certain implementations where the user system supports location-based services, the user system 110 can obtain route information (e.g., map images, directions, traffic data, etc.) from the user's location to a pickup location of the user's order by communicating with the location services system 150. Any currently-available location-based service provided by a mobile network or other third party provider may be used.

Content Delivery Network

The content delivery network 120 can communicate with the user system 110 and the computing system 130. The content delivery network 120 can communicate with the computing system (such as, e.g., the online ordering platform) to obtain restaurant information, such as, e.g., menu information, product images, or other content of the restaurant's webpage. The content delivery network 120 can include one or more edge servers which can deliver the restaurant information to the user system 110 based on the geographic location of the user system 110.

Location Services System

The location services system 150 can include geographic information systems (GIS) data or map data, such as map images, traffic data, restaurant locations, and so on. The location services system 150 can communicate with a user system 110 and provide route information as well as the restaurant's location information (such as, e.g., the address and distance) to the user system 110. The location services system 150 can communicate with the computing system 130 (e.g., the online ordering platform 132) to obtain the restaurants' locations, such as, e.g., the latitudinal and longitudinal coordinates of the restaurants. As will further be described below with reference to FIG. 7, in certain implementations, the computing system 130 can automatically suggest nearby restaurants to a user system 110 for a user to pick up an order. The computing system 130 can use the map data obtained from the location services system 150 and the location data of the user system 110 (which may be obtained from the user system 110 or the location services system 150) to identify restaurants within a certain radius of the user system 110 as well as receive route information from an identified restaurant to a user's location from the location services system 150.

Computing System

The example computing system 130 can include an online ordering platform 132, a backend processing system 134, one or more restaurant systems 136, a restaurant information data store 142, and a menu information data store 144. The restaurant information data store 142 can store restaurant information such as menu information, web images or videos, or other content that is rendered on the webpage of the restaurant. The menu information data store 144 can also store menu information, such as, e.g., product, price, tax rates and rules, restaurant specific menus, and so on. In certain implementations, the menu information data store 144 can include an enterprise data management system (EDM) that can manage the restaurant information stored in the menu information data store 144.

The online ordering platform 132 can interface with other elements in the computing environment 100, such as, e.g., the user system 110, the content delivery network 120, and the location services system 150. The online ordering platform 132 can also communicate with the restaurant information data store 142 to obtain the restaurant information, at least a portion of which may be passed to the content delivery network 120 for delivering to the user system 110. In certain implementations, the online ordering platform 132 can be implemented with an SAP Hybris Commerce Cloud Platform™ or another cloud platform (such as are available from Amazon AWS™ or Microsoft Azure™) Example details related to components and functionalities of the online ordering platform 132 are described below with reference to FIG. 2A.

The backend processing system 134 can be configured as a middleware integration application, which can handle order related calls between the restaurant system(s) 136 and the online ordering platform 132. In certain implementations, the backend processing system 134 can translate calls from one type of programming language to another. For example, the backend processing system 134 can translate data between one programming language (such as the Xenial™ language, which may be used by the backend processing system 134 and/or the restaurant system 136) and another programming language (such as the Hybris™ language, which may be used by the online ordering platform 132).

The backend processing system 134 can also access restaurant information, such as, e.g., menu data, price, tax rates, etc., from the menu information data store 144. In some embodiments, the restaurant information is loaded to the backend processing system 134 before the backend processing system 134 is deployed to start processing orders from the user system 110.

The online ordering platform 132 and the backend processing system 134 may reside on different servers. In some implementations, the communications among the online ordering platform 132, the restaurant system 136, and the backend processing system 134 are in real-time or near real-time, which can avoid delays in order processing. For example, order information (such as, e.g., item, quantity, and price) can be sent in real-time or near real time from the online ordering platform 132 to the backend processing system 134. The order status (e.g., received, checked-in, complete, etc.) obtained from the restaurant system 136 can also be communicated from the backend processing system 134 to the online ordering platform 132 in real-time or near real time. The online ordering platform 132 and the backend processing system 134 can also periodically synchronize with each other. For example, the online ordering platform 132 and the backend processing system 134 can perform daily synchronizations for differences in restaurant menus, pricing, and recipes.

The backend processing system 134 can also communicate with the restaurant system 136 in real-time, near real-time, synchronously, or asynchronously. For example, an order's status may be communicated from the restaurant system 136 to the backend processing system 134 in real-time or near real-time, while other types of information (such as, e.g., discount offers) may be synchronized periodically (e.g., once a day, every two hours, once a week, etc.). Details related to components and functionalities of the backend processing system 134 are further described below with reference to FIG. 2B.

The restaurant system 136 can communicate with the menu information data store 144 to retrieve menu information. The restaurant system 136 can also provide restaurant specific menus to the menu information data store 144 for storage. As will further be described below with reference to FIG. 2C, the restaurant system 136 may include one or more point of sale (POS) systems to fulfill an order of the user system 110.

Example Components of an Online Ordering Platform

Figure 2A:
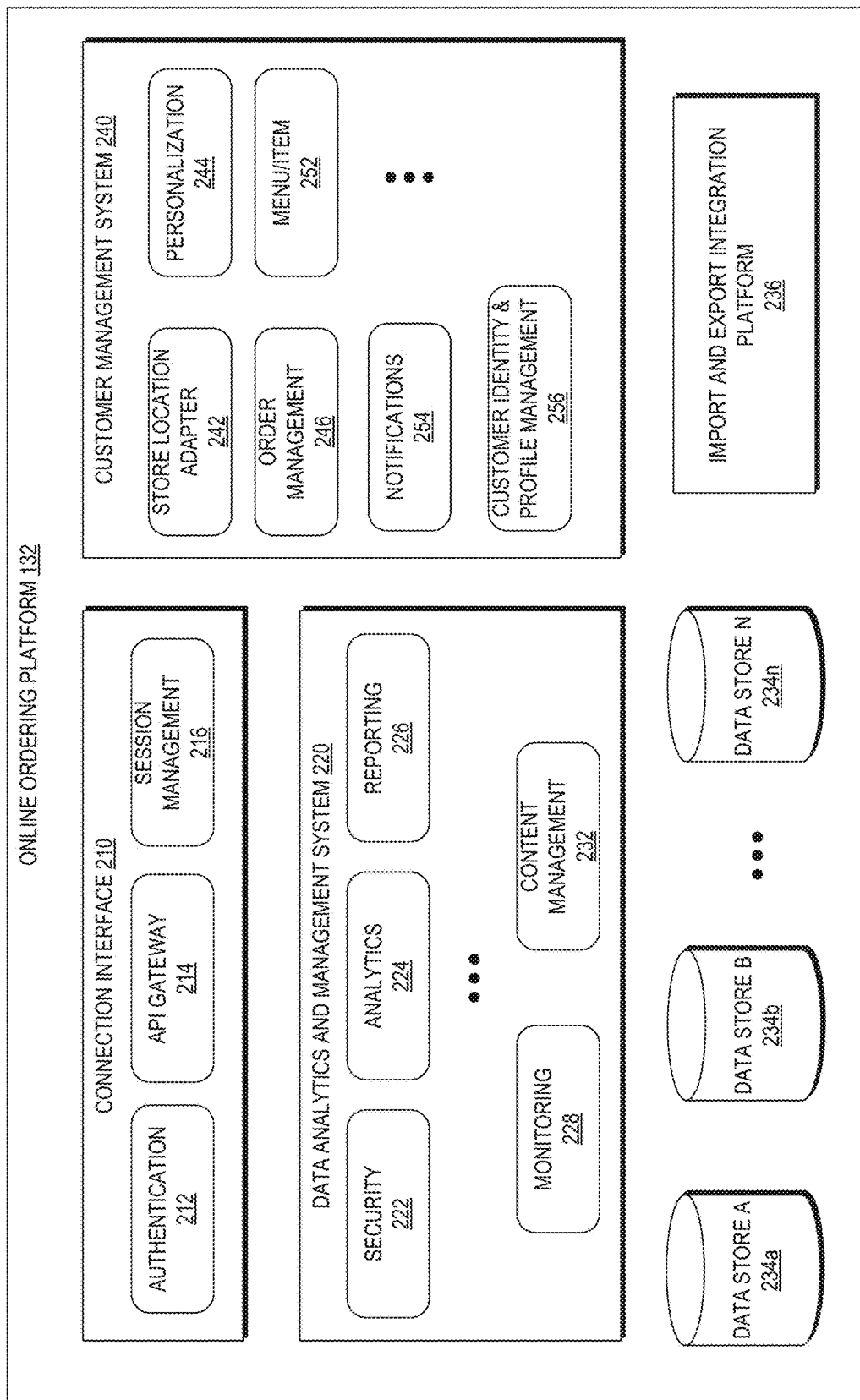
FIG. 2A illustrates example components of an online ordering platform.

FIG. 2A illustrates example components of an online ordering platform. The example online ordering platform 132 includes a connection interface 210, a customer management system 240, a data analytics and management system 220, and an import and export integration platform 236. The online ordering platform 132 can also include one or more data stores, such as, e.g., the data stores 234*a* through 234*n*, which may include physical computer storage. Although in this example, the online ordering platform 132 shows five major components, in various embodiments the online ordering platform 132 can include more or fewer components. For example, in some implementations, data analytics and management system 220 and the customer management system 240 may be combined. As another example, in some embodiments, the import and export integration platform 236 are optional.

Connection Interface

The connection interface 210 can include various components which can manage network communication with the user system 110. As illustrated, the connection interface 210 can include an authentication component 212, an API gateway 214, and a session management component 216, among other features.

The authentication component 212 can communicate with a user system 110 to verify or authenticate the user's identity. For example, the authentication component 212 can receive login credentials associated with the ordering application from the user system 110. The authentication component 212 can verify whether the user has provided the correct login information. Other authentication mechanisms may also be used, including authentication using biometric data, multifactor authentication, or the other currently-available authentication mechanisms.

The API gateway 214 can interface between the ordering application on the user system 110 and the computing system 130. For example, the API gateway 214 can serve as an entry point for the user system to communicate with the online ordering platform 132. The API gateway 214 can, for example, route requests received from the user system 110 and translate the requests from the user system 110 to a protocol used by the computing system 130.

The session management component 216 can manage the network connections between the online ordering platform 132 and the user system 110. For example, the user system can establish an online session with the online ordering platform 132 through a TCP/IP connection, and through an appropriate application protocol (e.g., if using a browser, through the Hypertext Transfer Protocol (HTTP)). During the online session, the user system 110 can browse products hosted by the online ordering platform 132, submit or edit an order, check in an order, or cancel an order, among other options discussed below. The session management component 216 can determine a termination of the online session with a user, such as, e.g., when the user closes the ordering application on the user system 110.

Data Analytics and Management System

The data analytics and management system 220 can include a variety of components which can perform data analytics and reporting associated with user data or order data (such as, e.g., data related to revenues, quantities, items, customization of items, etc.). The data analytics and management system 220 can also manage the webpage content delivered to the user system 110, such as, e.g., by providing customized content for a user based on the user's past activities or providing seasonal updates to the webpage content. The data analytics and management system 220 in FIG. 2A includes a security component 222, an analytics component 224, a reporting component 226, a monitoring component 228, and a content management component 232. However, in various embodiments, the data analytics and management system 220 can include more or fewer elements. For example, the analytics and management system 220 can also include a campaign management component which is configured to manage rules associated with discounts and offers for the products.

The security component 222 can execute security rules which may be provided by a restaurant. For example, the security component 222 may include authentication policies for verify a user's identity during an ordering process.

The analytics component 224 can perform data analytics associated with orders and users. The analytics component 224 may implement one or more machine learning algorithms to perform the data analytics.

The reporting component 226 can gather data associated with orders such as, e.g., quantities, prices, users who placed the orders, locations associated with such orders, sales data, and provide a report of the gathered data. The reporting component 226 can also compile results provided by the analytics component 224 to generate a report.

The monitoring component 228 can monitor the interactions between the user system 110 and the computing systems 130. The monitoring component 228 can also monitor the interactions within the computing system 110, such as, e.g., the interactions between the backend processing system 134 and the online ordering platform 132 or the interactions between the restaurant system 136 and the online ordering platform 132. The monitoring component 228 can also monitor the interactions between the computing system 130 and other external systems such as, e.g., outside payment processing systems or social networking sites.

The content management component 232 can manage online content of the webpage, such as, e.g., by updating items, prices, discounts, or images on the webpage. The updates of the content can be deployed to the content delivery system 120 for communication to the user system 110.

Customer Management System

The customer management system 240 can include one or more components for managing interactions between the computing system 130 and the user system 110. For example, the customer management system 240 can manage various aspects of the ordering process, such as, e.g., order creation, order check in, fulfillment, modification, cancellation, etc.

The customer management system 240 can include a store location adapter 244 for determining a user's location as well as nearby store locations. The store location adapter 242 can also automatically search for nearby locations based on the user's location or provide a suggested route from the user to the selected location. The location adapter 242 can also communicate with the location services system 150 to obtain the route information or to find the nearby store locations.

The order management system 246 of the customer management system 240 can process an order received from a user system 110. For example, the order management system 246 can identify the items as well as the corresponding prices and quantities submitted to the online ordering platform 132 through the connection interface 210. The order management system 246 can also be configured to communicate (e.g., via API calls) the order information to another system such as the background process to validate and further process the order.

The customer management system 240 can also include a notifications system 254. The notifications system 254 can generate reminders as well as error messages associated with the order. As one example, the notifications system 254 can cause a maintenance reminder to be communicated to the user system 110 for the user system 110 to show the reminder on the ordering application. The notifications can also be related to store or event hours. For example, the notifications system 254 can cause the ordering application on the user device to display a notification that the breakfast hours (e.g., where breakfast food is available) are from 7 am to 11 am. If the users are browsing the menu right before 11 am, the notifications system 254 may cause the ordering application to display a reminder that the breakfast hours are about to end. The notifications system 254 can also generate or communicate error notifications. For example, the notifications system 254 can determine whether a payment is successful (e.g., by communicating with a payment processing system) or determine whether one or more ingredients in an item is available in the store's inventory. The notifications system 254 can accordingly generate an alert that the order cannot be completed if the payment is not successful or if the ingredient is not available. The notifications system 254 can further communicate an alert to the user system 110 informing that the user can check in the order within a certain time period before the order is made.

As an example, the alert can include information that the order is about to be ready in 15 minutes and can request a user to confirm that the user would like to check in the order. Checking-in an order can confirm that a user is going to pick up the order at a designated time. The user can check in the order by actuating a user interface element on the online application. Actuating the user interface element can cause the order to be sent to the kitchen system 290 which can cause the store to start preparing the order. As will further be described with reference to FIGS. 8A through 9, the user can also change the pickup time through check-in. For example, the alert sent to the user system for order check-in can also include an option where the user can indicate that he will arrive at the store early or postpone the pickup time. By checking in the order, the online ordering platform 132 can provide an updated status to the backend processing system 134 which can cause the restaurant system 290 to send the order to kitchen display system 290 to start preparing the order.

The customer identity and profile management system 256 can access a user's profile information such as, e.g., name, address, credit card number, or other personal information. The customer and profile management system 256 can also process a request from the user system 110 to update the user's profile information, such as adding credit card numbers, changing address, etc.

The personalization system 244 can configured to process customer specific customizations, such as, e.g., ordering preferences (e.g., favorite orders, configurations for rapid reorder, etc.), or providing targeted offers based on the user's profile. The personalization system 244 can provide targeted offers based on data from the data analytics and management system 220. For example, the personalization system 244 can receive data analytics results associated with users having similar characteristics as the user and to provide certain products that the other users with similar characteristics find interesting. As will be further described herein, the personalization system 244 can further maintain and update the fast favorite order or rapid reorder's configuration. As another example, a user can customize ingredients in an item, and the personalization system 244 can initiate storage or access the item with the customizations for subsequent orders.

The customer management system 240 can also include a menu and item system 252. The menu and item system 252 can manage the synchronizations (e.g., with the backend processing system 134 or the restaurant information data store 142) and provisions of various menu information, such as, e.g., pricing, item name, image, ingredients, and so on. The menu information may be specific to a store location or a certain time period. In response to a change in store location, the menu and item system 252 may provide an updated menu specific to the updated store location. The backend processing system 134 can accordingly validate the order in view of characteristics of an updated store location to see if the updated store location has the items that the user want to order. The customer management system 240 can also synchronize with the restaurant information data store 142 or the backend processing system 134 for updated menu information. Such synchronization may but need not occur in real-time and may be bidirectional.

Although the customer management system 240 illustrated in FIG. 2A includes six components, in various embodiments, the customer management system 240 can include more or fewer elements. As an example, the customer management system 240 can include components related to offers and promotions, gift card managements, royalty rewards, payment systems, and so forth. The customer management system 240 can also include a search component, which can include APIs that allow a user to search for menu items in the ordering application.

Data Stores

The data stores 234a through 234n can store a variety of data such as customer information, order information, offering formation, royalty information, and so forth. In certain implementations, one or more of the data stores 234 can store a certain type of data. For example, the data store 234a can store customer information while the data store 234b can store to ordering information. In other implementations, one data store can include one or more database tables (relational or non-relational) for maintaining different types of data.

Import and Export Integration Platform

The import and export integration platform 236 can synchronize with the backend processing system 134, the restaurant information data store 142, etc. Such synchronization might be in real-time or in batch processing.

As an example, the import and export integration platform 236 can receive menu information from the restaurant information data store 142 periodically (e.g., once a day, twice a week, etc.). Upon receiving such information, the import and export integration platform 236 can communicate with one or more data stores 234 to update the records in the data stores 234. The import and export integration platform 236 can also synchronize with the backend processing system 134 in real-time for orders, notifications, etc. For example, the import and export integration system 236 can synchronize order information (such as, e.g., quantity, price, the user identifier, order status, etc.) between online ordering platform 132 and the backend processing system 134 while the online ordering is in progress.

Example Components of a Backend Processing System

Figure 2B:
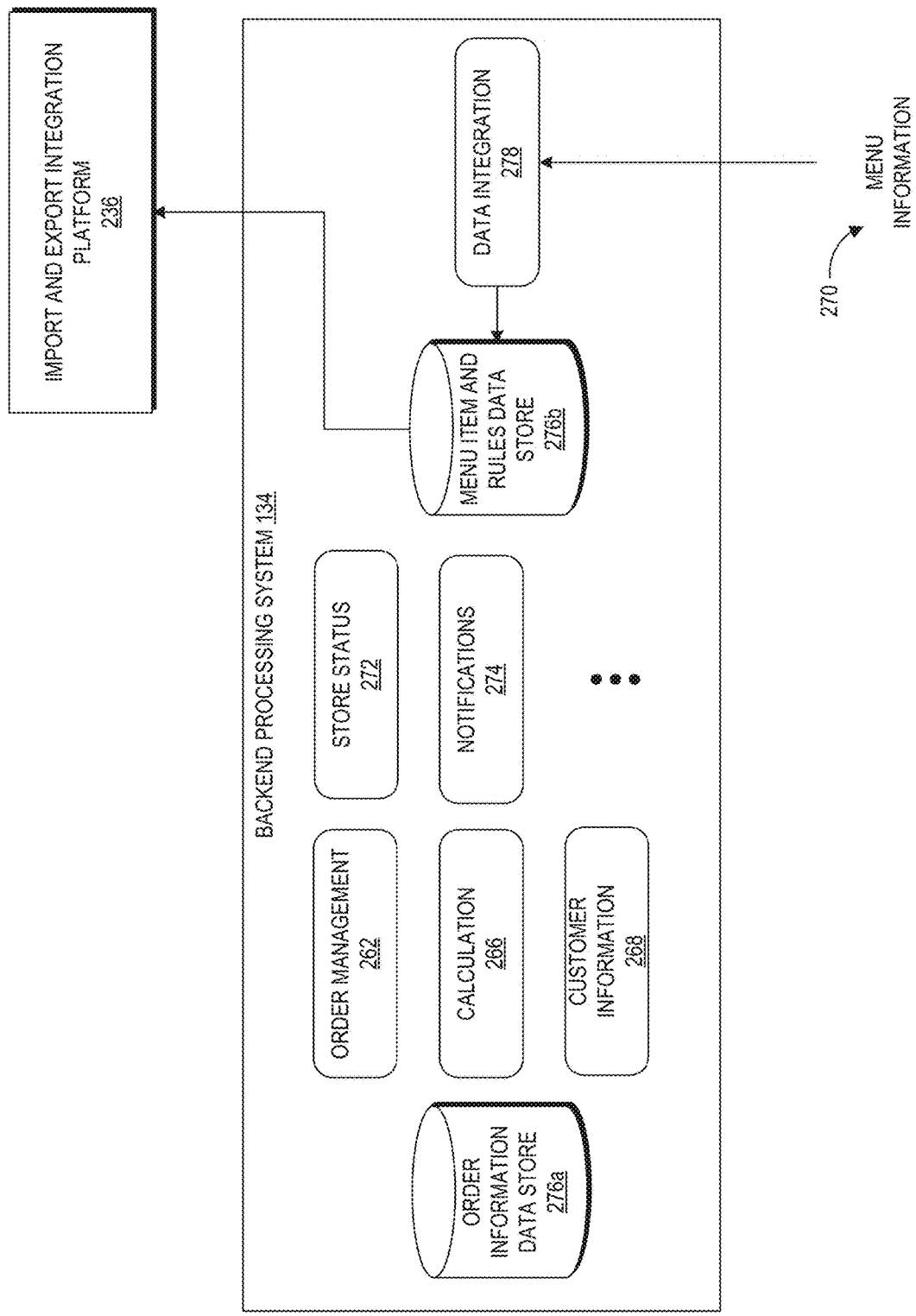
FIG. 2B illustrates example components of a backend processing system.

FIG. 2B illustrates example components of a backend processing system. The background processing system 134 can serve as an integration layer between the online ordering platform 132 and one or more restaurants systems 136. The backend processing system can route the request or notification to and from the online ordering platform 132 and the restaurant system 136. The backend processing system can also execute various validation rules for an order. The backend processing system 134 can be implemented in a cloud system.

The backend processing system 134 can include components such as, e.g. an order management component 262, a calculation component 266, a customer information component 268 and an order status component 272, and a notifications component 274. The backend processing system 134 can validate orders, calculating prices (and discount offers), generating notifications, and routing orders and messages in between the online ordering platform 132 and the restaurant system 136.

For example, the order management component 262 can receive order information from the online ordering platform 132. The order management system 262 can parse the order information received from the online ordering platform 132 to identify a store location or a POS system for which an order should be routed to. The order management system 262 can also validate the items in the order. For example, the order management system 262 can validate the items in the order by determining whether one or more items in the order or ingredients for an item are no longer available. The order management component 262 can also perform this validation by determining the current time of the order and determine whether the items ordered by the user has fallen outside of the time associated with the appropriate item. For example, the order management component 262 can determine whether a breakfast item is ordered during lunch time, and thus, may be invalid.

The calculation component 266 can perform price calculations of an order as well as other miscellaneous costs such as sales tax. In certain implementation, a user can modify the order after the order has been submitted, and the calculation routine 266 can accordingly recalculate the price based on the updated order.

The customer information component 268 can parse an order to identify the user's personal information, such as, e.g., address, payment details (such as credit card number), name, and so forth. The customer information component 268 can also access the user's information if the user has previously provided such information. For example, the customer information component 268 can communicate with one or more data store to obtain the user's previously stored credit card number. The customer information component 268 can communicate customer information to the restaurant system 136 for the restaurant system 136 to fulfill the order.

The store status component 272 can check the store status (e.g., by communicating with the restaurant system 136). For example, the store status component 272 can determine whether the store it's open or whether the store supports online orders.

The notifications component 274 can communicate notifications between the restaurant system 136 and the online ordering platform 132 which may be further passed to the user system 110. The notifications component 274 can also generate notifications, such as, e.g., alerts due to failures in order validations and communicate such alerts to the online ordering platform 132.

The backend processing system 134 can include a data integration component 278. The data integration component 278 can include software executable code which can synchronize menu information with the menu information data store 144 and can initiate storage of such information into the menu item and rules data store 276b.

The menu item and rules data store 276b may be a data store secondary to the menu information data store 144 shown in FIG. 1. For example, the menu item and rules data store 276b may include duplicate menu information as the menu information data store data store 144. The information in the menu item and rules data store 276 can be passed to the online ordering platform 132, for example via the important export integration platform 236. The backend processing system 134 can also include an order information data of store 276a which can store order information such as the customer's information, content of the order, as well as the order status such as, e.g., received, completed, in progress or cancelled.

Example Components of a Restaurant System

Figure 2C:
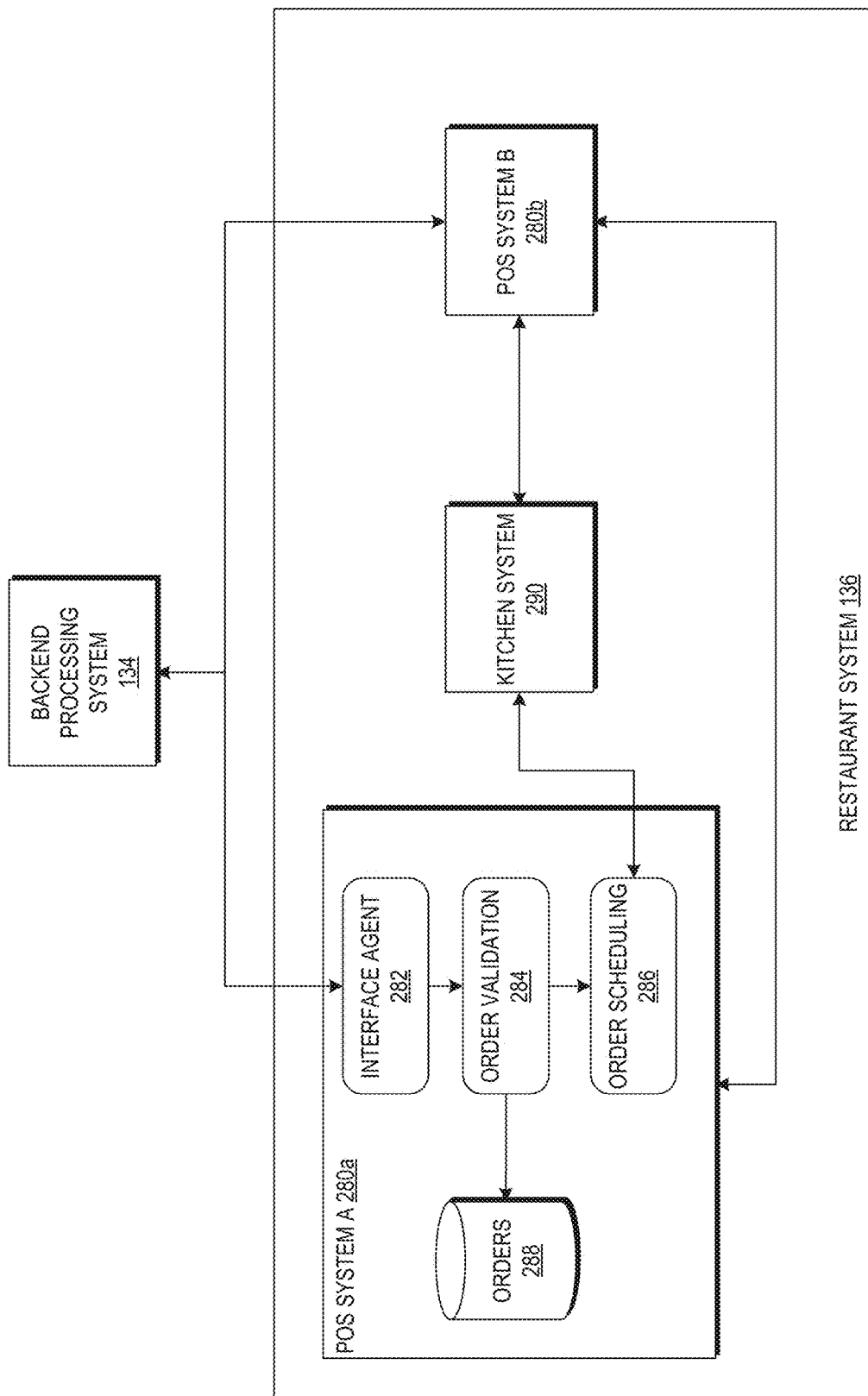
FIG. 2C illustrates example components of a restaurant system.

FIG. 2C illustrates example components of a restaurant system 136. The restaurant system 136 can be associated with one or more stores. The restaurant system 136 can include one or more point of sale (POS) systems in 288*a*, 288*b*, and a kitchen system 290. Each of these systems can be computer systems and may be implemented as computers, servers, or the like. The one or more POS systems may be associated with the same store in some situations. Although in this example the restaurant system 136 includes one kitchen system 290 and two POS systems, in various embodiments, the restaurant system 136 can also include fewer or more kitchen or POS systems.

The POS system 280 can include an interface agent 282, an order validation component 284, and an order scheduling component 286. The POS system 280 can also include an orders data store 288 configure to store order information, such as, e.g., the status or content of an order. In some embodiments, the orders data store 288 may be a secondary data store while the data store 234 can be a primary data store. As a result, the data store 234 can be the master of the order information while the orders data store 288 and the POS system 280 can be a user of the data maintained by the data store 234.

The interface agent 282 can be in communication with the background processing system 134. For example, the interface agent 288 can receive order information from the backend processing system 134 which was validated by the backend processing system 134. The interface agent 288 can also communicate the message from the POS system 280 to the backend processing system. For example, the interface agent can communicate an alert that one or more ingredients in item have been sold out in the store. As another example, the interface agent 288 can communicate an update to the order status such as a change from pending to completed, from received to cancelled, or from received to being made (due to a user checking in the order).

The interface agent 288 can also communicate with an order validation system 284. The order validation system 284 can process an order received from the backend processing system 134 and determine whether the payment has been processed or whether one or more ingredients or items in an order are no longer available. The order validation system 284 can also communicate orders information to the order status store 288.

The order validation system 284 can communicate orders to an order scheduling component 286. In some implementations, the order validation system 284 can send the order to the ordering scheduling system 286 in response to a determination that the order has passed one or more order validation rules.

The order scheduling system 286 may be associated with a queue or other types of data structures for temporarily storing the order. The order scheduling system 286 can communicate with the kitchen system 290 to pass the orders to the kitchen system 290. In some implementations, such as, e.g., when the POS system A and the POS system B are in the same store, the kitchen system 290 and the order scheduling systems (at the POS system A and B) may have bi-directional replication or communications of the order data. Such bi-directional replication of ordering data can occur every few seconds such as, e.g., less than 3 seconds, 5 seconds, etc.

The kitchen system 290 manage order preparation for a store, e.g., based on cooking time, ingredient, item identifier, etc. The kitchen system 290 can manage an order such that items in the order are ready at about the same time. For example, if a burger takes ten minutes to cook while the fries take five minutes, the kitchen system 290 can provide an indication to delay the start time of the fries and the burger can be ready around the same time. The kitchen system 290 can manage an order by, e.g., providing a view of a sequence of preparation and starting times of the items or a view of the recipe for the items in the order, among other features. The kitchen system 290 can also include and manage a list of orders that are being made. For example, an order with fewer items may be schedule to be made before another order which has more items. Once an order on the kitchen system 290 is prepared, the order status may be changed from pending (or from being made) to ready for pickup. In some implementations, the kitchen system 290 can include a kitchen display system, which can allow workers in a store to view the list of orders that are currently being prepared, ingredients for each item, etc.

Further, although the details of the POS system B 280*b* is not shown in this FIGURE, in certain implementations, the POS system B 280*b* can have similar components and functions as the POS system A 280*a*.

Example of Order Creation Processes

Figure 3:
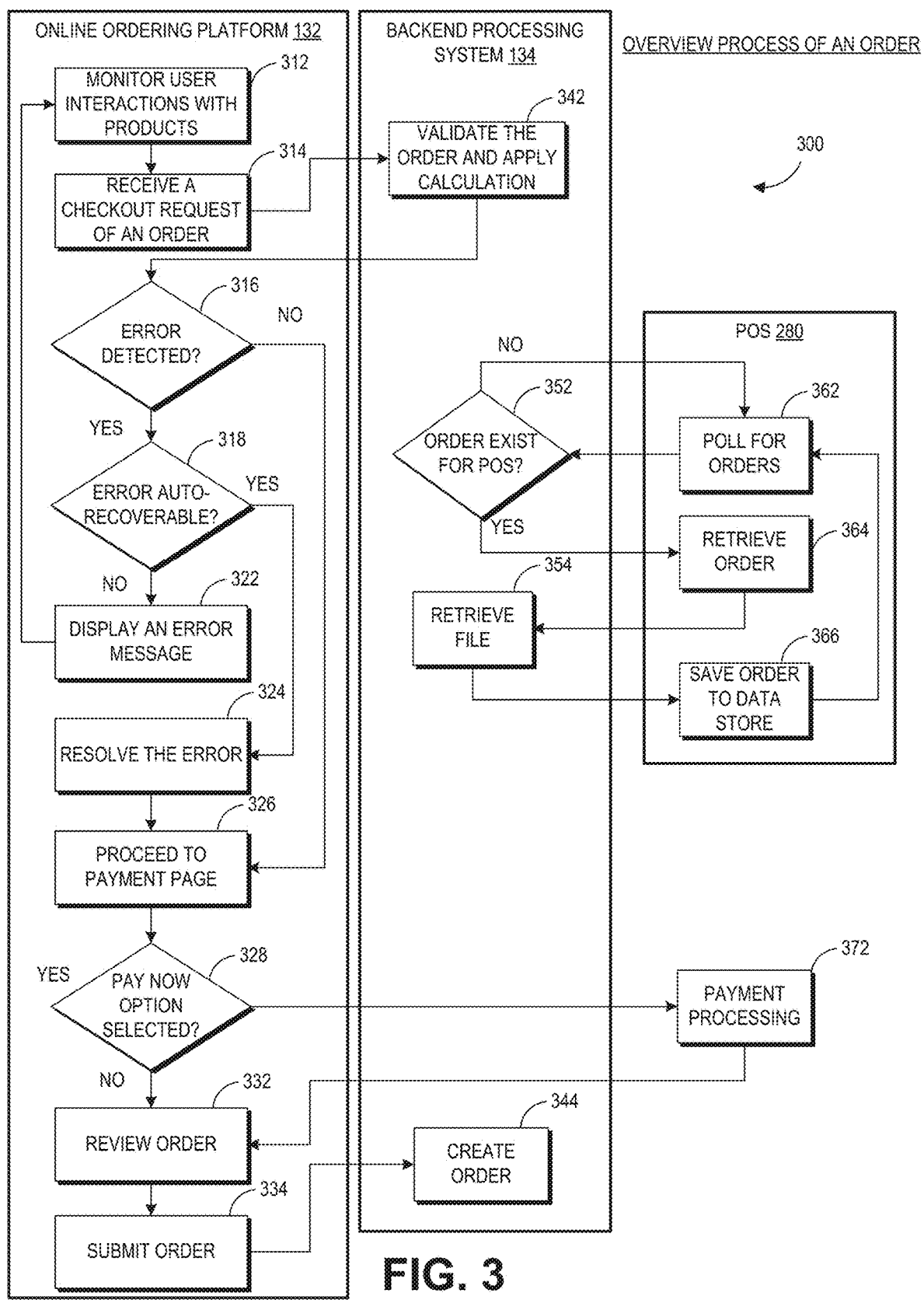
FIG. 3 illustrates an example flowchart for an order creation process.

FIG. 3 illustrates an example flowchart of an order creation process. The example process 300 may involve the online ordering platform 132 the backend processing system 134, the POS system 280, and a payment processing system which is not shown in FIG. 3. In this example, the online ordering platform 132 can interact with a user system 110 for an ordering session. The backend processing system 134 can perform order calculations (e.g., price calculations) as well as order validations (e.g., store hours or availability of items). The example process 300 can be applicable when a user system accesses the computing system 130 via a mobile application or a web browser.

At block 312, the online ordering platform 132 can monitor user interactions with products. For example, the user can browse products on the ordering application at the user system 110. The online ordering platform 132 can monitor that user's activities on the ordering application (e.g., whether a user has opened a certain page or clicked on a certain item).

At block 314, the online ordering platform 132 can receive a checkout request for an order. For example, the online ordering platform 132 can receive the checkout request when the user has triggered a rapid reorder (which will further be described with reference to FIGS. 4A through 5C).

Upon receiving the checkout request, the backend processing system 134 can validate the order and apply calculations associated with the orders at block 342. For example, the backend processing systems 134 can access order information (e.g., items, quantity, price, store location, pickup location, etc.) and perform a variety of validations associated with the order. For example, the backend processing system 134 can validate whether a store location has the requested items in the order (e.g., based on the store's inventory and the time of the order). The backend processing system 134 can also validate whether certain ingredients are compatible with the base item as well as whether additions or removals of certain ingredients are allowed by the restaurant. The backend processing system 134 can also determine whether an application of coupon or discount code is correct. The backend processing system 134 can apply price calculations to the order such as, e.g., by providing an itemized breakdown of the final price as well as a final price before and after tax. Where the backend processing system 134 can finds any issues in an order, the backend processing system can pass an error message to the online ordering platform 132.

At block 316, the backend processing system 134 can determine whether any errors have been flagged by the backend processing system 134. If there is no error detected, the process 300 proceeds to the block 326. If there are one or more errors, the online ordering platform 132 proceeds to block 318 where the online ordering platform 132 determines whether the error is recoverable.

If the error is not recoverable, at block 322, the online ordering platform 132 can display an error message or cause an error message to be displayed at the user system 110 by communicating a notification data packet to the user system 110. If the error is auto recoverable, the process proceeds to block 324 where the online ordering platform 132 can automatically resolve the error. As an example, if the backend processing system 132 determines that the address of the user is inaccurate because the zip code is slightly off, the online ordering platform 132 may automatically correct the inaccuracies. However, on the other hand, if the error is due to unavailability of an item, the online ordering platform 132 may determine that this era is not recoverable. The online ordering platform 132 may accordingly proceed to block 322 and informing the user system 110 that the ordered item is no longer available.

Figure 4A:
FIGS. 4A and 4B illustrate example user interfaces for ordering with rapid reordering features of an application.
Figure 4B:
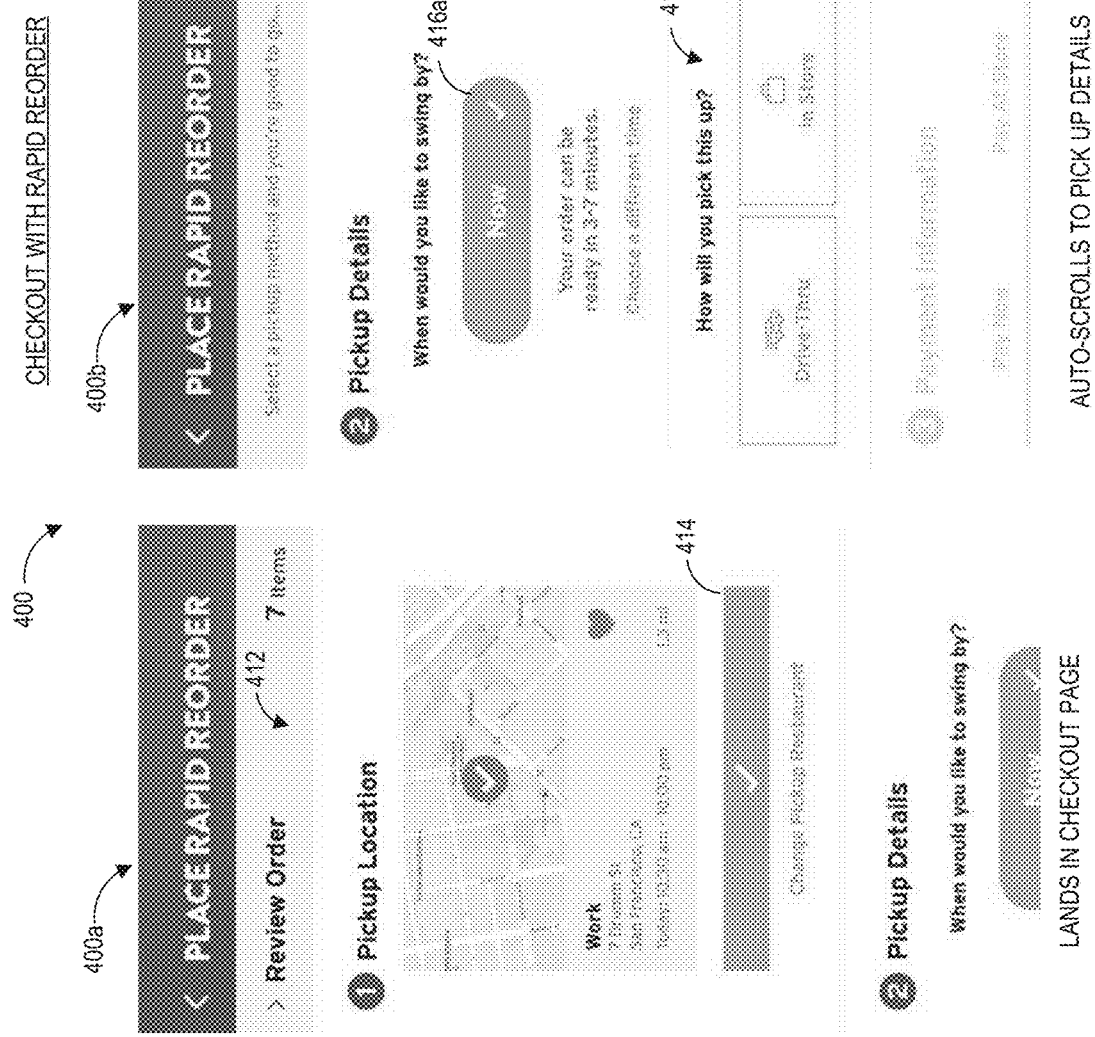

At block 326, the online ordering platform 132 can proceed to a payment page, an example of which is shown in the user interface 400 in FIG. 4B. In some situations, the payment page can have the options of pay now or defer payment until the user arrives at the store. If the pay now option is selected at block 328, the process 300 can proceed to block 372, where the payment processing occurs. The payment processing can include tokenizing a credit card number inputted by the user. The payment processing can be performed by one or more payment systems or providers which are not shown in FIG. 3.

If the pay now option is not selected at block 328, the process 300 can proceed to the block 332, where the online ordering platform 132 can cause an order review page to be rendered on the user system 110. The order review page may be part of the example user interface 400 showing FIG. 4B. The online ordering platform 132 can also receive a submission of an order from the user system 110. Accordingly at block 334, the online ordering platform 132 can submit the order to the backend processing system 134.

Upon receiving the submitted order, at block 344, the backend processing system 134 can create an order object. The order object can comprises computer data representation of order information of one or more items, rather than the items themselves. The order object can be associated with a data structure that is created using object-oriented programming or non-object-oriented programming. The created order objects may be stored in the order information data store 276a. The backend processing system 134 can also communicate the order information to the POS system 280.

At block 362, the POS system 280 can poll for available orders by communicating with the backend processing system 134. At block 350, the backend processing system 134 can determine whether there is an order existing for the POS system. If there is no available order for the POS system 280, the process 300 goes back to block 362. If there is an available order for the POS system 280, the process 300 proceeds to the block 364, where the POS system 280 retrieves the order from the backend processing system 134. Upon receiving the request from the POS system to retrieve the order information, the backend processing system 134 can access a file associated with the order at the block 354. The file may include order information such as, e.g., price, quantity, consumer information, and so on. The POS system 280, upon receiving the file from the backend processing system 134, can save the orders to a data store (such as, e.g., the stores data store 288 in FIG. 2C). The process then proceeds from block 366 to block 360, where the POS system 280 can continue to poll for orders by communicating with the backend processing system 134.

Rapid Reorder

In some embodiments, the ordering application described herein can include a rapid reorder feature which can allow a user to place an order without needing to add the items in the order to a shopping cart. The order may include an item, a combination of items, and their corresponding quantities and customizations. As used herein, the word item can refer to a product's representation in computer storage and the product itself, unless otherwise noted.

Further, the rapid reordering for an order can be triggered without first presenting to the user what is included in the order. Instead, when the rapid reorder feature is triggered, the ordering application can automatically present a checkout user interface. In certain implementations, the ordering application can enable the rapid reorder feature for only one order, and thus a user may not use the rapid reorder features for multiple combinations of items at the same time. Further, the user may not be able to add or remove additional items from the order if the user places the order via the rapid reorder feature.

The ordering application on a user system 110 can communicate with the computing system 130 (e.g., the backend processing system 134) to valid an order prior to the submission of the order. For example, the backend processing system 134 (e.g., the order management component 262) can check whether the items in the order are still available to be sold and check whether the items are available at the user's selected location. The backend processing system 134 can also perform price calculation (e.g., via the calculation component 266) prior to the submission of the order from the ordering application.

FIGS. 4A and 4B illustrate example user interfaces for ordering with rapid reordering features of an application. FIG. 4A illustrates examples of triggering the rapid reordering of an order while FIG. 4B illustrates an example of a checkout user interface associated with the rapid reorder.

Each of the user interfaces shown in FIGS. 4A and 4B (as well as in other user interfaces discussed below) includes one or more user interface controls that can be selected by a user, for example, using a browser or other application software (such as a mobile application). Thus, each of the user interfaces shown may be output for presentation by electronic hardware as graphical user interfaces. The user interface controls shown are merely illustrative examples and can be varied in other embodiments. For instance, any of the user interface controls shown may be substituted with other types of user interface controls that provide the same or similar functionality. Some examples of user interface controls that may be used include buttons, dropdown boxes, select boxes, text boxes or text fields, checkboxes, radio buttons, toggles, breadcrumbs (e.g., identifying a page or interface that is displayed), sliders, search fields, pagination controls, tags, icons, tooltips, progress bars, notifications, message boxes, image carousels, modal windows (such as pop-ups), date and/or time pickers, accordions (e.g., a vertically stacked list with show/hide functionality), and the like. Additional user interface controls not listed here may be used. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input (e.g., finger or stylus), game controller, or keyboard input, among other user interface input options. Although each of these user interfaces are shown implemented in a mobile device, the user interfaces or similar user interfaces can be output by any computing device, examples of which are described above.

FIG. 4A shows two user interfaces 402a and 402b. As shown in the user interface 402a, the rapid reordering feature can be triggered by actuating a button 404 (which may be a 3D touch for iOS™ devices or a long press for Android™ devices) on a mobile device. Advantageously, in some embodiments, the rapid reorder feature can be triggered without needing to first open the ordering application. For example, a user can press on an icon of the ordering application on a mobile device which can trigger a long press or 3D touch feature. When the 3D touch or the long press feature is triggered, the mobile ordering application can be invoked and the mobile ordering app can present the user interface 402a, which provides a rapid reorder element 406a. Upon receiving the selection of the rapid reorder feature, the mobile device can activate the mobile ordering application. In certain implementations, the mobile ordering application may be running as a background process prior to the 3D touch or long press on the display. The mobile ordering application may also be invoked even though it was not running in the background. In addition to the user interface element 406a, the user interface 402a can also include other options associated with the ordering application. For example, by actuating the user interface element associated with "Favorites," the ordering application can present a favorite order screen (such as, e.g., the user interface 610 shown in FIG. 6A) or a favorite item which lists favorite items associated with a user account rather than favorite orders. As another example, by actuating the user interface element associated with "Food Menu," the ordering application can present a menu of the restaurant to the user. As yet another example, if the user interface element associated with "Locations" is actuated, the ordering application can present a user interface which can allow a user to perform a store location search or automatically find store locations near the user's current location.

In certain implementations, the user interface element 406a is displayed if the user logged into the ordering application. If the user has not set up a designated order for rapid reordering, the ordering application may present a user interface (e.g., the user interface 510 in FIG. 5A) where the user can set up the rapid reorder. If a user does have a valid designated order, the user can be taken directly to a checkout user interface (e.g., the user interface 400). If the designated order is invalid (e.g., due to unavailability of items or closed store locations), the ordering application can present a user interface for editing the designated order.

The rapid reorder feature can also be triggered at the homepage of the ordering application as shown in the user interface 402b. The rapid reorder feature can be triggered when the user interface element 406b is actuated (e.g., when the user presses on the corresponding position a touch screen). Although the user interface 402b is shown with reference to a mobile device, the user interface 402b can also be part of a webpage which the user system 110 can render via a browser.

In addition to or in alternative to 3D touch (or long press) and application homepage, the rapid reorder feature can also be triggered at other places, such as, e.g., by tapping a user interface element associated with the predesignated element at a user interface for a list of favorite orders or at an order history page. A user can also bring up the user interface 402a via other techniques, such as, e.g., by actuating a button on the mobile device.

After the rapid reorder feature is triggered, the application can present a checkout user interface 400 as shown in FIG. 4B. A user can scroll through the user interface 400 to view the user interface screens 400a, 400b, and 400c. The checkout user interface 400 can include various sections, such as, e.g., a review order section 412, a pickup location section, a pickup details section, a payment information section, and a user interface element 418 for submitting the order. In certain implementations, as shown in FIG. 4B, a user can scroll through the user interface 400 to navigate among the sections within the checkout user interface 400. For example, the user can scroll up on the user interface 400 which can take user from the user interface screen 400a to the user interface screen 400b. The various sections in the checkout user interface 400 can be pre-populated and the user can review the information in the checkout user interface 400 prior to confirming the order.

The screen 400a shows the review order section 412, and the pickup location section. The review order section 412, when expanded can allow a user to review items in the order as well as their corresponding customizations, quantities, and prices. The pickup location section can show the store location, hours, and distance from the user's current location. The pickup location section can also include one or more user interface element 414 which can allow a user to confirm or change the pickup location.

The screen 400b shows the pickup details section. The pickup details section can specify the time of order pickup at the user interface element 416a. The pickup details section can also ask how the order would be picked up at user interface element 416b, such as, e.g., via drive-thru or in store.

The pickup time in the screen 400b is shown as "Now." As a result, the order may be communicated in real-time to a restaurant system 136 (via the online ordering platform 132 and backend processing system 134). The restaurant system 136 may start preparing the order upon receiving the order. Although not shown in FIG. 4B, in some embodiments, the pickup options can also include a future date. For example, in addition to the option "now", the ordering application can also present an option for picking up tomorrow at noon. In certain embodiments, the pickup for the designated order is pre-selected as "Now". However, if picking up now is not an option (e.g., due to store closures), the option "Now" may be suppressed and user will be prompted to select a pickup time.

The screen 400c shows the payment information section. In this section, the user can select the "pay now" option where the user can select a payment method. The user can also select pay at store option which the user can defer payment until later.

The user interface 400 can also include a user interface element 418, when actuated, can allow a user to submit the order under the rapid reorder. As described with reference to FIGS. 1 through 3, the order information can be communicated from the user system 110 to the online ordering platform 132 which can process the order and communicate the order to the backend processing system 134 which can calculate the price and validate the order. The order can further be passed from the backend processing system to the restaurant system 136 for fulfillment. The order information can be communicated to the online ordering platform 132 or the backend processing system 134 in real-time as the order is in progress on the user system 110. The order information can also be communicated to the online ordering platform 132 or the backend processing system 134 after the user has submitted the order (e.g., after the actuation of the user interface element 418).

Fast Favorite

As mentioned with reference to FIGS. 4A through 4B, the rapid reorder feature can be enabled for a designated order. This designated order is also referred to as a fast favorite order in some embodiments. A user can set an order as a fast favorite from either a favorite order user interface or from a track order status user interface. In certain implementations, if an order is set as the fast favorite order, the location and payment details associated with the order may not be automatically associated with the rapid reorder. For example, if the user has a default payment method, the default payment method can surface as a part of the checkout process even though the default payment method may be different from the payment method used for the order that is designated as the fast favorite order. In some embodiments, only one order can be set as the fast favorite order at a given time. Other embodiments contemplate including multiple fast favorites.

Setting Up an Order as the Fast Favorite Order

If a user has not set up a fast favorite order, a user can select a fast favorite order from the user's favorite orders. If there is only one favorite order associated with a user account, this favorite order may automatically be made as the fast favorite order when this order is set as favorite. As an example, once a user has configured an order as favorite, the user may be prompted to give the new favorite order a custom name. If no custom name is provided by the user, the default name of "Favorite Order 1" can be assigned to the favorite order. Once the order has been selected and named, that order may be promoted to a fast favorite (assuming there are no other favorite orders).

If the user account does not have a favorite order, the ordering application can present a collection of consolidated orders from the user account's order history. The consolidated orders include orders that have a distinct combination of products. Thus, one or more of the duplicative orders may be removed from this collection of consolidated orders. The ordering application can leave the most recent instance of the duplicative orders in the collection of consolidated orders.

The ordering application (alone or in combination with the computing system 130) can validate an order prior to setting the order as the fast favorite order. An order in which at least one item is no longer available cannot be set as the fast favorite order. For example, the ordering application can disable the user interface element for setting the order as the fast favorite order.

Figure 5A:
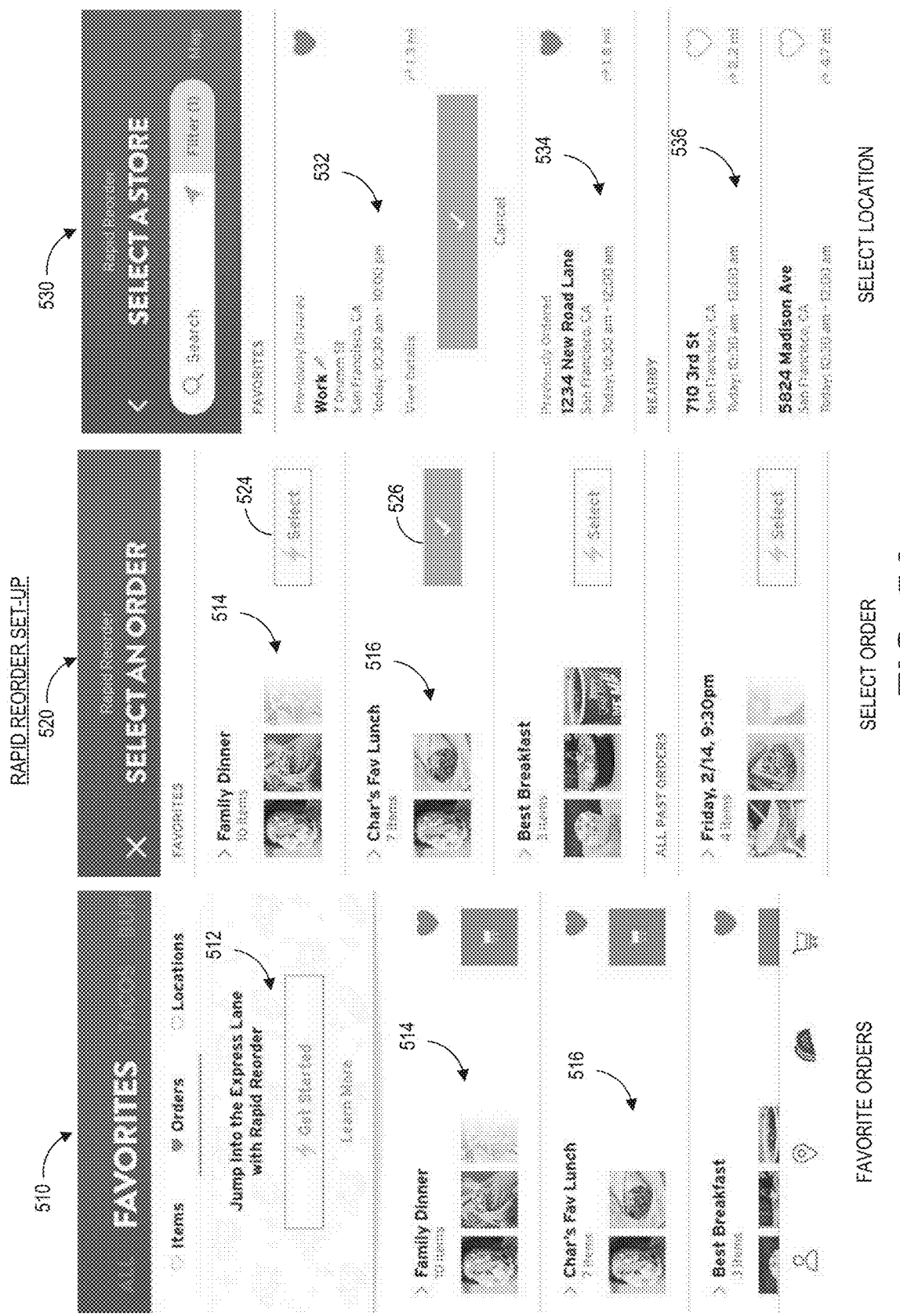
FIGS. 5A, 5B, and 5C illustrate examples of setting up and editing an order for rapid reorder.
Figure 5B:
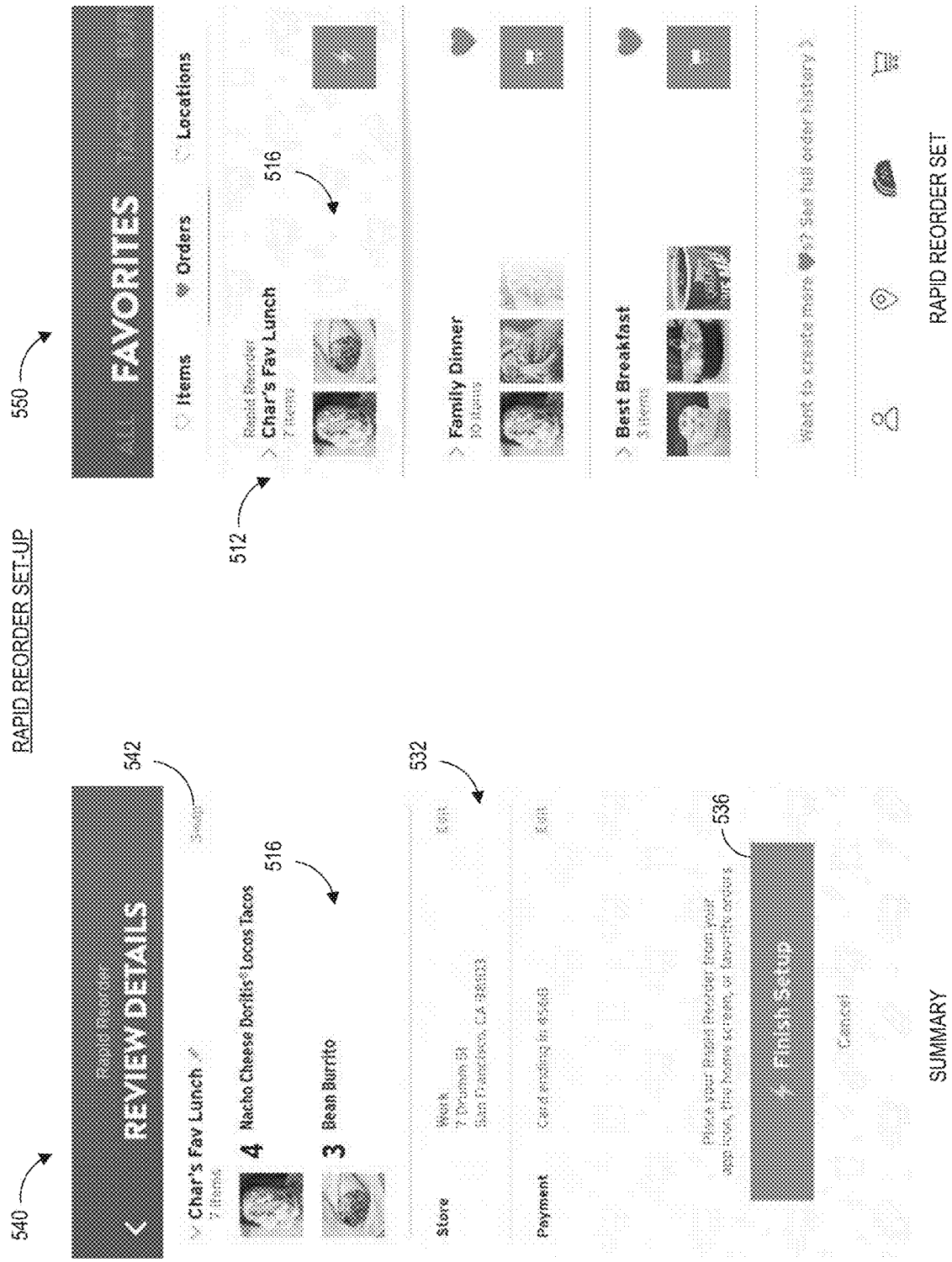

FIGS. 5A and 5B illustrate examples of configuring a rapid reorder. FIG. 5A shows three user interfaces 510, 520, and 530. The user interfaces 510 and 520 illustrate an example for configuring an order for rapid reorder from favorite orders. The user interface 510 shows a rapid reorder section 512 and two favorite orders 514 and 516. As shown in the user interface 510, the rapid reorder feature has not been set up. A user of the ordering application can set up the rapid reorder feature by actuating the "get started" element in the rapid reorder section 512 on the user interface 502. The user interface 504 shows an example of designating a favorite order for rapid reorder. In this example, the rapid reorder is enabled for the order 516 (as shown by the user interface element 526). The user can change the rapid reorder from the order 516 to another order, such as, e.g., the order 514 by actuating the user interface element 524.

The user interface 530 shows an example of selecting a store location for the rapid reorder. The store can be selected from favorite stores (e.g., the stores 532 and 534), stores near the user's current location (e.g., the store 536) or the user's favorite store(s), or a previously new stored location as entered by the user, etc. As shown in the user interface 530, the store location 532 is selected or designated by default as the store location for the rapid reorder.

FIG. 5B illustrates the user interfaces 540 and 550. The user interface 540 provides a summary for the rapid reorder. The summary can include the items, quantity, store location, and payment. The user interface 540 can include the user interface element 516. When the user actuates the user interface element 536, the ordering application may present the user interface 550, which can populate the rapid reorder section 512 with the order 516 (which in this example is designated for rapid reorder).

The user interface 540 can also include the user interface element 542, which can allow a user to swap the designated order (e.g., the order 516) with another order. Once the user interface element 542 (is actuated, the ordering application can present the user interface 560 shown in FIG. 5C where the user can change the designated order to another order.

Editing the Fast Favorite Order

The user can edit a fast favorite order, e.g., at a user interface associated with favorite orders. The ordering application can also present the option for editing the fast favorite order if an error occurs. For example, the ordering application can receive, from the computing system 130, a notification that an item in the fast favorite order or the entire order is no longer available. Upon receiving such notification, the user can be directed to a user interface for updating the fast favorite selection.

In certain implementations, the user is directed to the user interface for updating the fast favorite selection in response to a determination that the entire order is no longer available. If part of the order is no longer available, the ordering application can proceed to checkout with the remaining items. Upon successfully completing checkout, the user's fast favorite order (e.g., as stored by the computing system 130) can be update based on the configuration of the remaining available items.

Figure 5C:
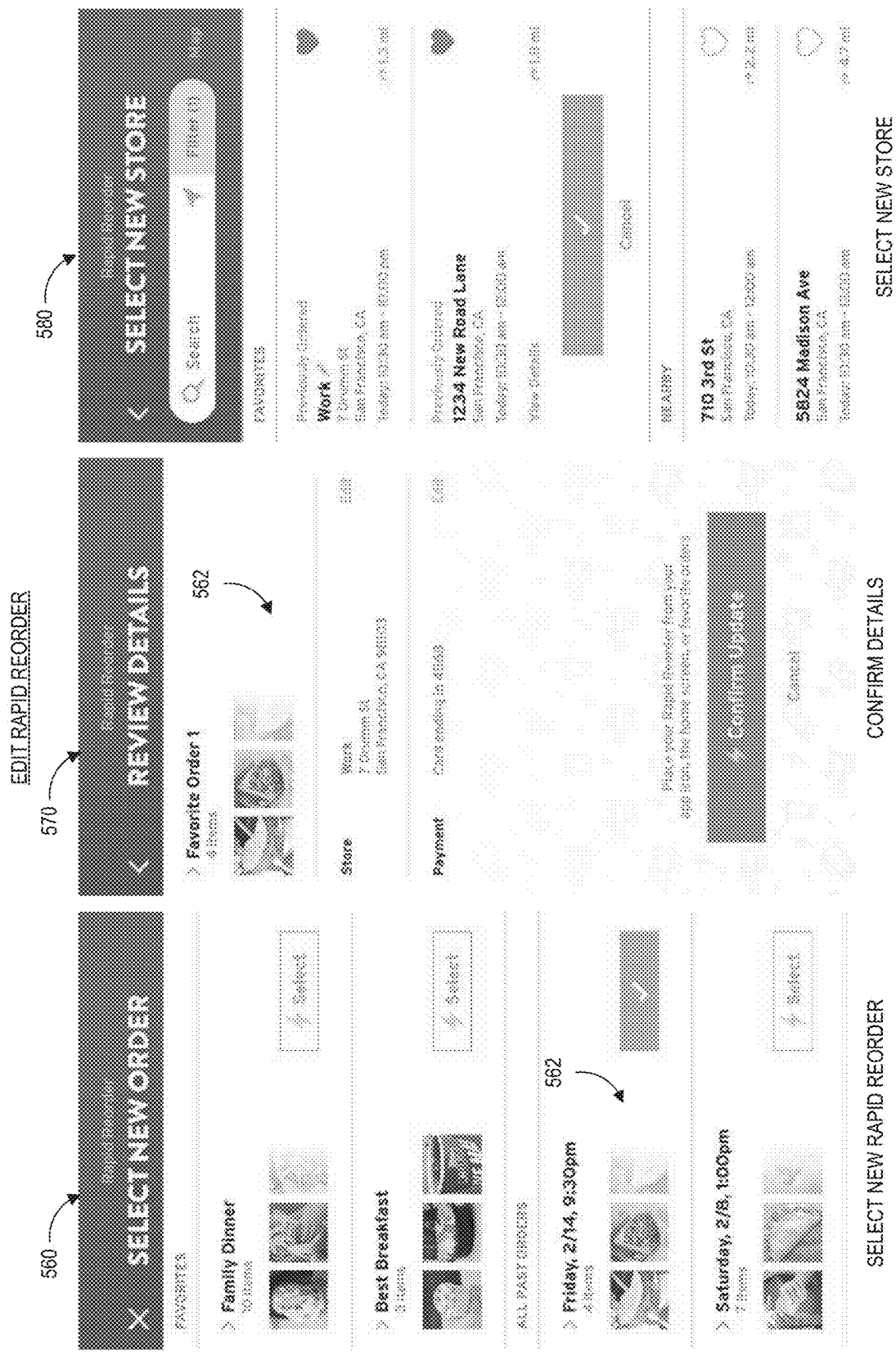

FIG. 5C illustrates example user interfaces related to editing a designated order for rapid reorder. In FIG. 5C, three user interfaces 560, 570, and 580 are shown. At the user interface 560, the user can select a new order as the fast favorite order for rapid reordering. For example, the user can change the designated order to the order 562 for rapid reordering. As a result, the items and their corresponding quantities in the order 562 can be ordered via the rapid reorder. In this example, the order 562 can be selected from past orders. Once the order 562 is selected for rapid reorder, the rapid reorder feature may be disabled for the order 516. Thus, the ordering application can allow one designated reorder at a given time. Further, in some embodiments, the user is no longer able to edit the fast favorite order once the user triggers the rapid reorder feature.

The user interface 570 in FIG. 5C shows the order 562 is designated for rapid reorder. In some implementations, if an order is selected for rapid reorder but the order is not a favorite order, the ordering application may automatically cause the order to be added to the favorite list. In some situations, when the designated order is changed, the items (and quantities) configured for the rapid reorder can change but other configurations (such as, e.g., the store and payment method) may remain the same. The user can edit the store location (e.g., as shown in the user interface 580) and the payment method separately.

Although the examples in FIG. 5C illustrate swapping one order with another for rapid reordering, in some implementations, the user can also edit items in the order (rather than swapping the order as a whole). For example, the user can edit the quantity or customization of the order 516 for rapid reorder while setting it up for rapid reorder or after the order 516 has been designated for the rapid reorder.

Figure 6A:
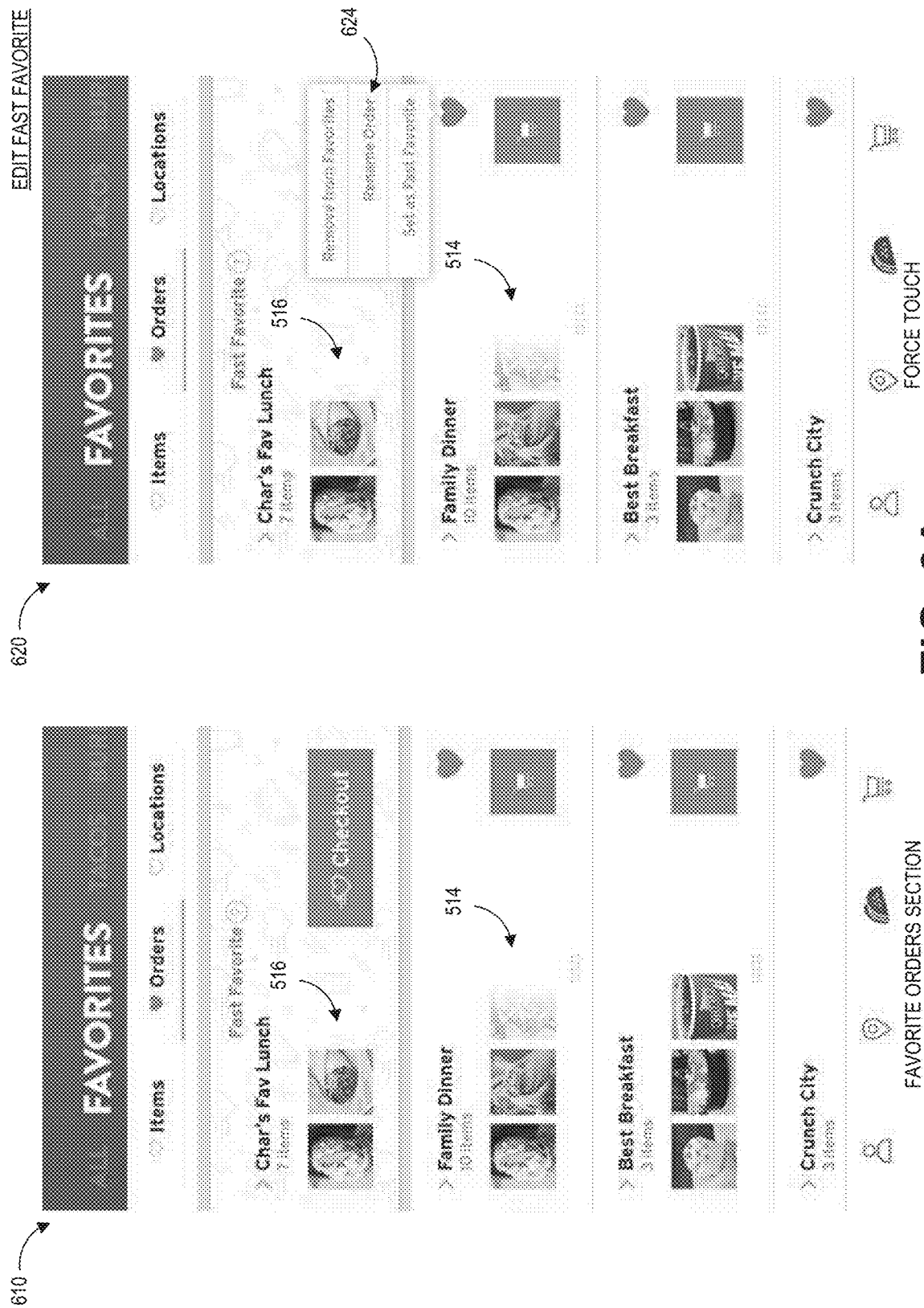
FIGS. 6A and 6B illustrate additional examples of editing a fast favorite order.
Figure 6B:
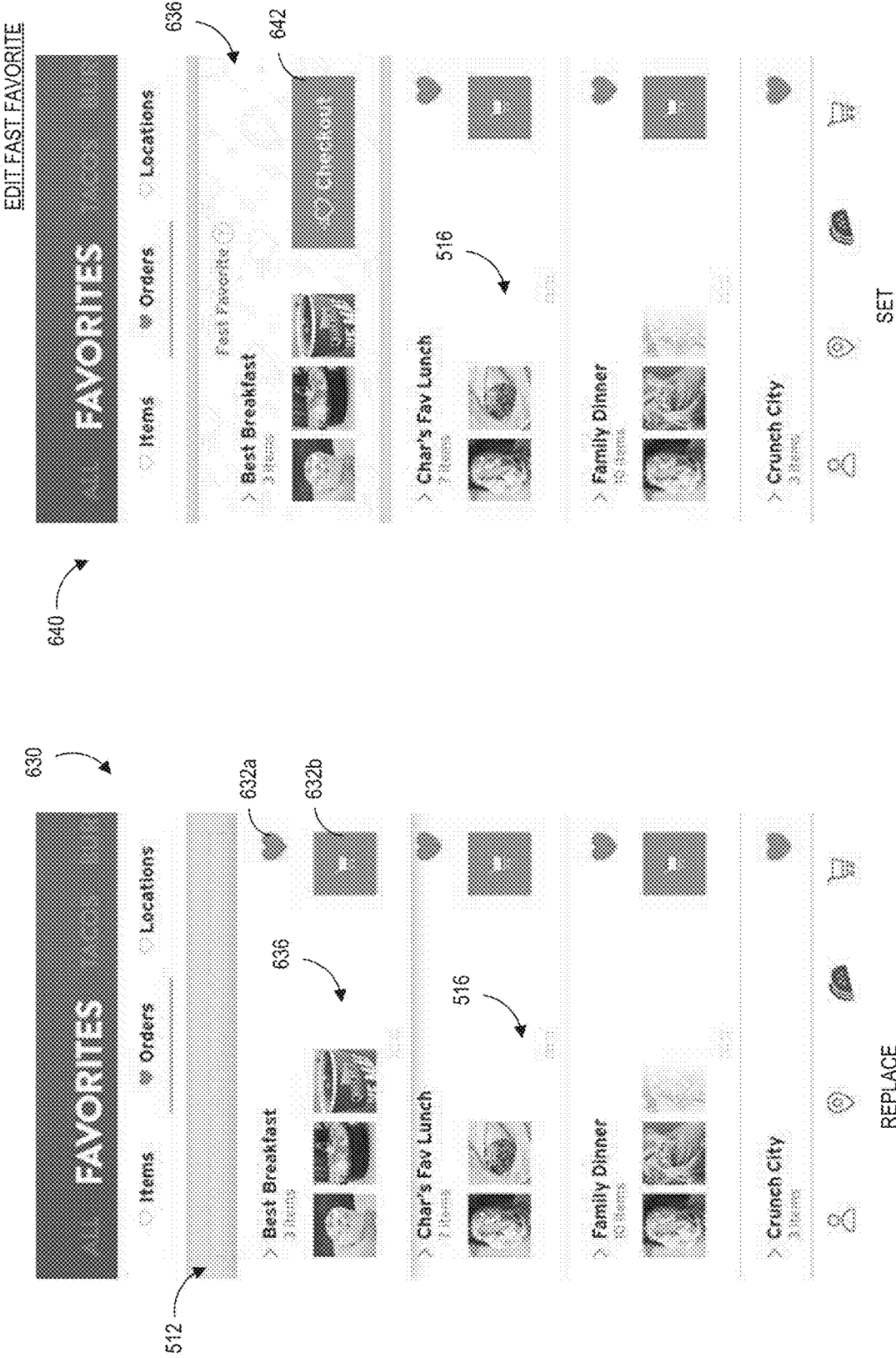

FIGS. 6A and 6B illustrate additional examples of editing a fast favorite order. FIG. 6A shows two user interfaces 610 and 620. The user interface 610 shows two orders 516 and 514 in a screen associated with favorite orders. In this example, the order 516 is set as the fast favorite order.

With reference to the user interface 620, the user can actuate a user device to open a selection menu 624 associated with the order 514. For example, the ordering application can detect a long or hard pressured tap on a mobile device and can open the selection menu 624 in response. The selection menu 624 can contain the following example options: remove from favorite (which would cause the order 514 to be removed from the favorite orders), rename order (which would direct to a screen for customizing the name of the order 514), and set as fast favorite (which would replace the order 516 with the newly selected favorite fast favorite order 514 and would cause a confirmation screen to be presented).

FIG. 6B shows two user interfaces 630 and 640. With reference to the user interface 630, a user can change the fast favorite order from the order 516 to the order 636 but dragging the user interface element associated with the order 636 into the region 512. Once the user interface element associated with the order 636 is in the region 512, the order 636 is set as the fast favorite order while the order 516 is no longer the fast favorite order. For example, as shown in the user interfaces 630 and 640, once the order 636 becomes the fast favorite order, the user interface elements 632a and 632b can be replaced with the user interface element 642 to indicate that the order 636 went from a favorite order to the fast favorite order.

Location Based Orders

The ordering application described herein can also provide location based ordering features. As described with reference to FIG. 1, the computing system 130 can communicate with the location services system 150 to obtain the location information of the stores. The computing system 130 can also communicate with a user device to obtain the user's current location.

The ordering application can allow a user to locate a store by searching via zip code, address, city, or state. The search for nearby stores may be performed with reference to the current location of the user. The ordering application can also allow the user to change the store location at various points during an ordering process, such as, e.g., at the checkout user interface, or after adding an item to an online shopping cart, etc.

When the user selects a new location prior to placing an order, the computing system 130 (e.g., the backend processing system 134) can validate the user's order to see whether the items in the cart are available at the new location. If an item is not available, it may be removed from the cart and the computing system 130 can cause the ordering application to display a message to the user. The message may request confirmation from the user that he wants to continue the ordering process with the unavailable item removed from the order. In certain implementations, if an item is not available, the computing system 130 may determine if an equivalent item exists at the new store. If so, the equivalent item can replace the original item including the customizations to the original item.

In addition to or in alternative to validate the availability of items (and/or the customizations to the items), various other types of validations can also be performed. Below are example pseudocodes for performing some of the validations when a store location is changed.

```
servesBreakfast( ): If PointOfService.openingTimeBreakfast and
PointOfService.closingTimeBreakfast are defined and there is a non-zero range of
time between them where the given store serves breakfast, return true
hasDriveThru( ): If PointOfService.openingTimeDriveThru and
PointOfService.closingTimeDriveThru are defined and there is a non-zero range of
time where the given store has a Drive Thru open, return true
isOpenNow( ): if current time is between opening and closed hours for current store,
return true
isOpenSoon( ): if current time is less than 30 minutes before opening time, return true
isClosedSoon( ): if current time is less than 30 minutes before closing time, return true
isOpenLaterToday( ): if current time is before PointOfService.openingTime and
PointOfService.openingTime is before PointOfService.closingTime (indicating store
is open that day), return true
isOpenLate( ): if PointOfService.closingTime is later than 11pm/23:00, return true
isOnlineOrderingTemporarilyUnavailable( ) - return true if POSConnectionFailed ==
true or current time less than 15 minutes before PointOfService.closeTime
```

In addition to or in alternative to changing the store location prior to checkout, the location can also be changed for a submitted order. The option to request a change in the pickup location of the order may be available until the order is sent to the kitchen (e.g., before the order is taken out of the pending order queue and is sent to the kitchen system 290). Upon choosing to edit the pickup location, the initial order may be cancelled by the computing system 130 and a new order may be issued by the computing system upon submission of the updated pickup location. In certain implementations, to present order cancellation after the order is sent to the kitchen, the POS system 280 may be the master system of order status and can prevent any cancellation or change that is sent by the online ordering platform 312. Upon selecting a new location, the backend processing system 134 can automatically validate the order at the new location as described herein. Such validation process may be similar to those performed on the order prior to submission. The user may also be notified if any items in the order are unavailable upon selection of a new store.

Figure 7A:
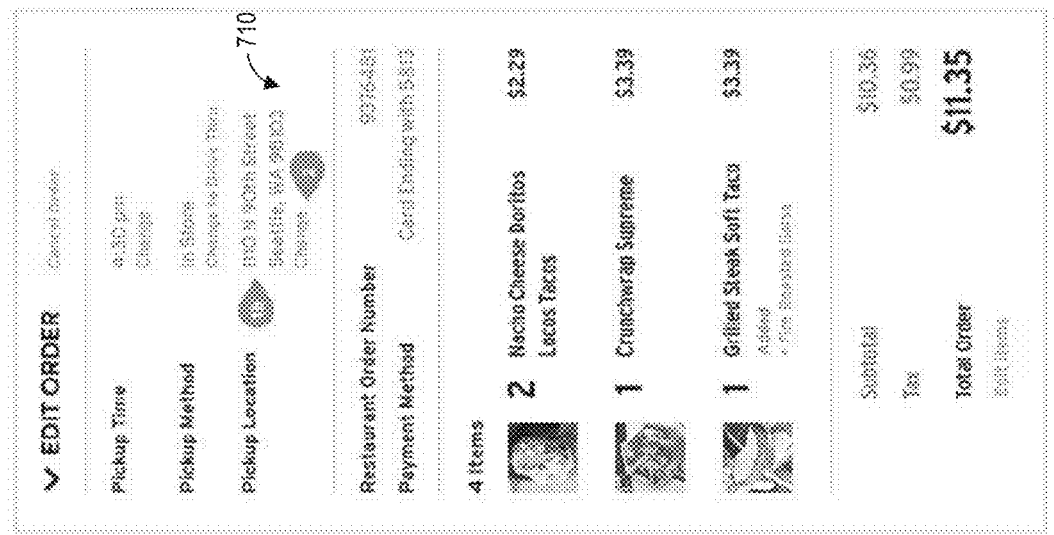
FIGS. 7A and 7B illustrate an example of changing a store location after an order is submitted.
Figure 7A:
Figure 7B:
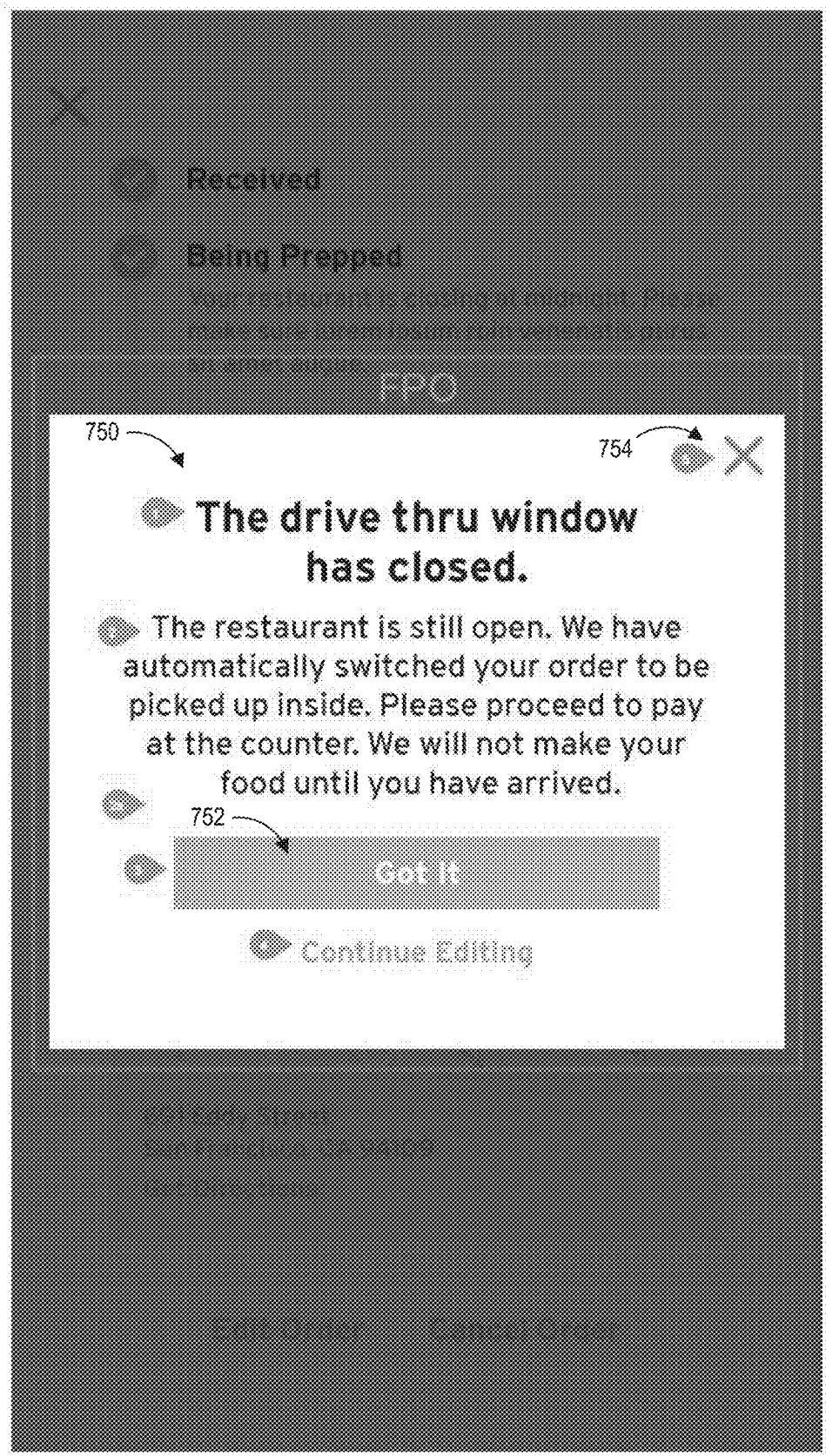

FIGS. 7A and 7B illustrate an example of changing a store location after the order is submitted to the computing system 130. As shown in the example user interface 700 in FIG. 7A, the order status is "being prepared". The user can actuate the user interface element 710 initiate a change of the pickup location. In certain implementations, the user interface element 710 is enabled during the "received" and "being prepped" states of order status. Once the order transitions to "being made", the user interface element 710 may be suppressed.

Once the user actuates the user interface element 710, the computing system 130 can validate the order for the new pickup location and prompt a message to the user to confirm the change. When the user confirms the change on the user system 110, the computing system 130 can cancel the existing order and create a new order with the updated pickup location. FIG. 7B illustrates an example user interface message 750 which shows on the user system 110 after the computing system 130 has performed the validation on the new location. The example user interface message 750 shows an explanation text explaining an error has occurred to the order due to the change of the new location. However, the error may be automatically recoverable. As shown in the user interface message 750, although the drive thru window is closed at the new location, the store is still open, and the computing system 130 can automatically change the pickup option from drive thru to instore. The user may confirm the change of store location and the automatic change of the pickup option by actuating the user interface element 752. The user can also cancel the change, e.g., by actuating the user interface element 754. If the user cancels the change, the original order can remain as is and a new order for the updated location will not be issued.

Order Check-in

Advantageously, in some embodiments, once a user submits an order, the order is not communicated to the kitchen system 290 upon submission. Rather, the user can have an option to check-in the order after the submission, and the order is sent to the kitchen system 290 for fulfillment after the order is checked in. For example, when a user submits the order and the payment, the order information can be communicated to the restaurant system (e.g., the POS system 280) from the backend processing system 134. The restaurant system 136 may place an order in a pending order queue, (e.g., which may be part of the POS system 280). Once the order is checked-in, the order may be communicated from the pending order queue to the kitchen system 290.

The order check-in can occur through an ordering application, by responding to a notification delivered to the user system 110, or via a POS system 280. For example, the user can actuate a user one or more user interface elements associated with checking in the order on the ordering application to cause the order to be checked-in. The order check-in can also occur automatically. For example, the backend processing system 134 and/or the online ordering platform 132 can automatically check in the order after certain duration of time has elapsed sent the notification was delivered to the user system 110. In certain implementations, if order has already been checked in, it will not be able to be checked in again. The ordering application can prompt an error message explaining the order is already checked-in.

The order check-in may be available for an editable order even though such order has already been submitted. However, if an order is no longer editable, e.g., because the order has been cancelled, the order check-in option may no longer be available. Accordingly, upon receiving a check-in request, the ordering application can prompt with an error message in response to a determination that the order was canceled (e.g., by a POS system) and thus the order check-in option is no longer available.

Further, editing orders cannot occur post check-in. For example, to prevent fraudulent activity, the POS 280 may be the master system of order status and can prevent any cancellation or change that is sent by the online ordering platform 132 (which may receive such request from the user system 110) after the order is checked-in or is sent to the kitchens system 290. For example, if the order status is checked-in at the POS 280, the POS 280 may reject the cancellation (or update) request related to the order. The ordering application can accordingly display an error message informing the user that the cancellation or updating request has failed. An example code snippet for validating a check-in action is provided below.

```
@Controller
@RequestMapping(value = "/checkout")
public class CheckoutController extends AbstractCheckoutController
{
...
@RequestMapping(value = "/checkIn/" +
ORDER_CODE_PATH_VARIABLE_PATTERN, method =
RequestMethod.POST)
@ResponseBody
public Map<String, Object> checkIn(@PathVariable("orderCode") final
String orderCode)
{
final Map<String, Object> result = new HashedMap( );
final OrderData orderDetails =
orderFacade.getOrderDetailsForCode(orderCode);
String errorKey = null;
if (OrderStatus.CANCELLED.equals(orderDetails.getStatus( )))
{
errorKey = "checkin.error.message.ordercanceled";
}
else if (OrderStatus.BEING_MADE.equals(orderDetails.getStatus( )) ||
OrderStatus.READY.equals(orderDetails.getStatus( )))
{
errorKey = "checkin.error.message.checkin";
}
else if (!orderFacade.checkIn(orderDetails))
{
errorKey = "checkin.error.message.requestfail";
}
final boolean isSuccess = errorKey == null;
result.put(STATUS, isSuccess);
if (!isSuccess)
{
result.put(MESSAGE, getMessageSource( ).getMessage(errorKey, null,
getI18nService( ).getCurrentLocale( )));
}
return result;
}
...
}
```

In addition to or in alternative to validating the check-in action based on order status, the code segment below describes some further validations on the check-in action.

```
...
public class DefaultTacoBellOrderFacade extends DefaultOrderFacade
implements
TacoBellOrderFacade
{
...
@Override
public boolean checkIn(final OrderData orderDetails)
{
Assert.notNull(orderDetails, "orderDetails can not be null");
if (getTacoBellCheckoutFacade( ).isOrderEditable(orderDetails.-
getStatus( )) && PickupMethodEnum.INSIDE.getCode( )
        .equals(orderDetails.getPickupMethod( )) &&
        !orderDetails.isPayAtStore( ))
{
```

```
final BaseStoreModel baseStoreModel =
getBaseStoreService( ).getCurrentBaseStore( );
final OrderModel orderModel =
getCustomerAccountService( ).getOrderForCode(orderDetails.getCode( ),
baseStoreModel);
final PointOfServiceModel store = orderModel.getPointOfService( );
//if "in store" method current unavailable, change it to "drive through"
final DayPartMessageData dineInDayPart =
getPointOfServiceService( ).getDineInDayPartMessage(store);
if (!(dineInDayPart == null ||
DAY_PART_STATUS_INSIDE.equals(dineInDayPart.-
getDayPartStatus( ))))
{
final DayPartMessageData driveThruDayPart =
getPointOfServiceService( ).getDriveThruDayPartMessage(store);
if (driveThruDayPart == null ||
DAY_PART_STATUS_INSIDE.equals(driveThruDayPart.-
getDayPartStatus( )))
{
updatePickUpMethod(orderModel.getCode( ));
}
}
orderModel.setStatus(OrderStatus.BEING_MADE);
getOrderService( ).saveOrder(orderModel);
return true;
}
return false;
}
...
```

Once the order is checked-in and has passed various validations, the backend processing system 134 may be notified of the updated ordering status. For example, the backend processing system 134 may be notified by the online ordering platform 134 that the order status has changed from received to checked-in. The backend processing system 134 can further communicate this updated status to the restaurant system 136 which can move the order from a pending order data store to the kitchen system 290.

The ordering application and the computing system 130 can also allow early check-in for an order, which can notify that restaurant that the user may arrive before the scheduled pickup time. As an example, for in-store orders, a user has the option to check-in now which may trigger the order to be sent to the kitchen system 290 for preparation, even the scheduled pick-up time may be an hour later. The ordering application can also send a notification (which may come from the restaurant system 136) informing the user that the order will be ready within a certain time frame (e.g., in 5, 10, 20 minutes, etc.). The order pickup time may be dynamically adjustable based on the order size. An example code segment for adjusting pick up based on the order size is provided below.

```
...
public class DefaultRestaurantPickUpTimeFacade implements
RestaurantPickUpTimeFacade
{
...
@Override
public OrderPrepareLevel getOrderPrepareLevel(final
AbstractOrderData order)
{
Configuration configuration =
getConfigurationService( ).getConfiguration( );
OrderPrepareLevel level;
final double price =
order.getTotalPrice( ).getValue( ).doubleValue( );
if (price < configuration.getDouble("order.ready.time.small.totalPrice", 0))
{
level = OrderPrepareLevel.SMALL;
}
else if (price >=
configuration.getDouble("order.ready.time.small.totalPrice", 10)
&& price < configuration
.getDouble("order.ready.time.medium.totalPrice", 20))
{
level = OrderPrepareLevel.MEDIUM;
}
else if (price >=
configuration.getDouble("order.ready.time.medium.totalPrice",
20) && price < configuration
.getDouble("order.ready.time.large.totalPrice", 30))
{
level = OrderPrepareLevel.LARGE;
}
else
{
level = OrderPrepareLevel.EXTRA;
}
return level;
}
...
```

In certain implementations, the early check-in option may not be available for drive thru and pay in-store orders. The user can also select or edit the pickup time at the time of check-in. However, the ordering application (alone or in combination with the computing system 130) can validate the pickup time such that the user will not be able to select time that is not available for pickup (e.g., a time outside of the store's business hours).

Figure 8A:
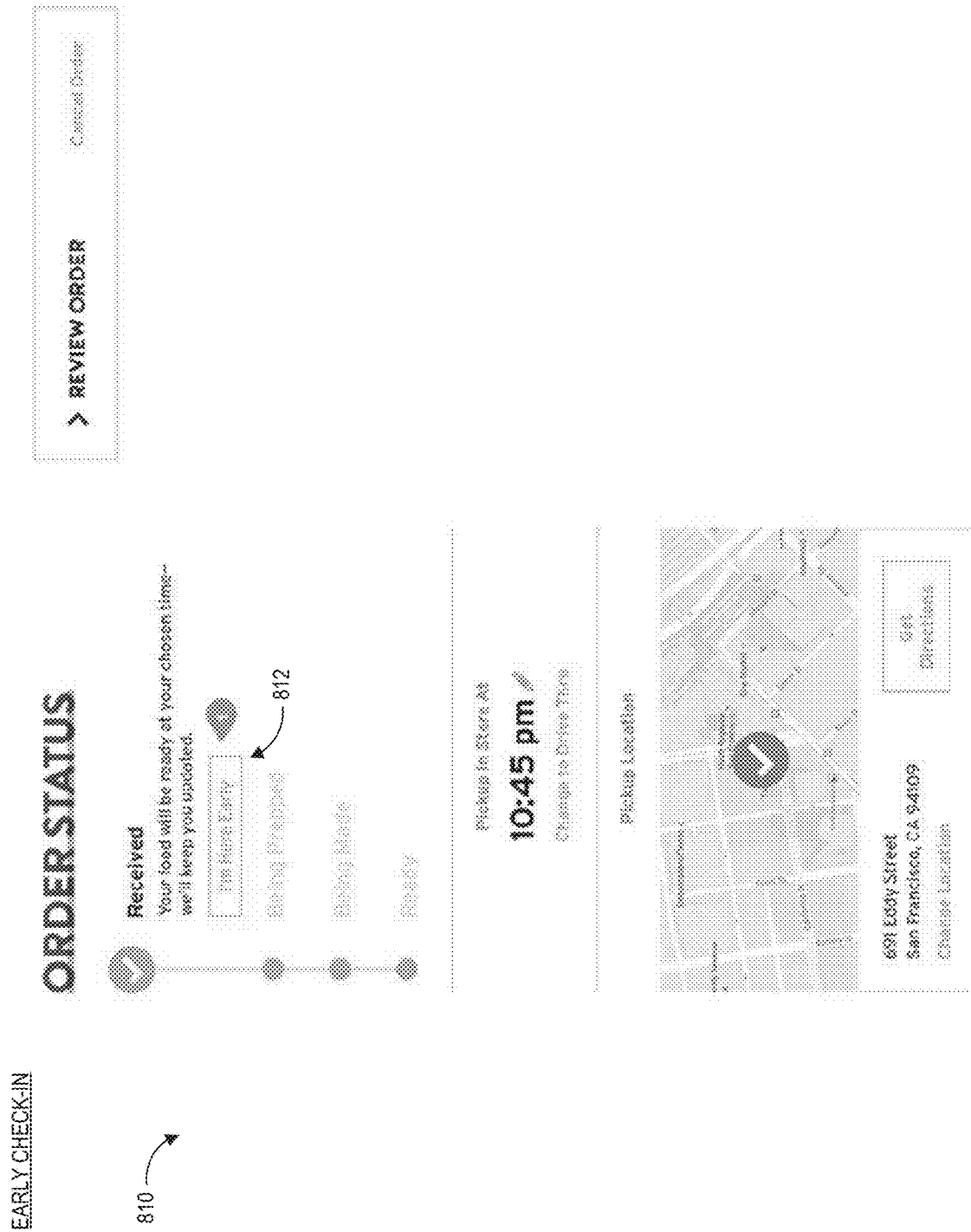
FIGS. 8A and 8B illustrate example user interfaces for an early check-in of an order.
Figure 8B:
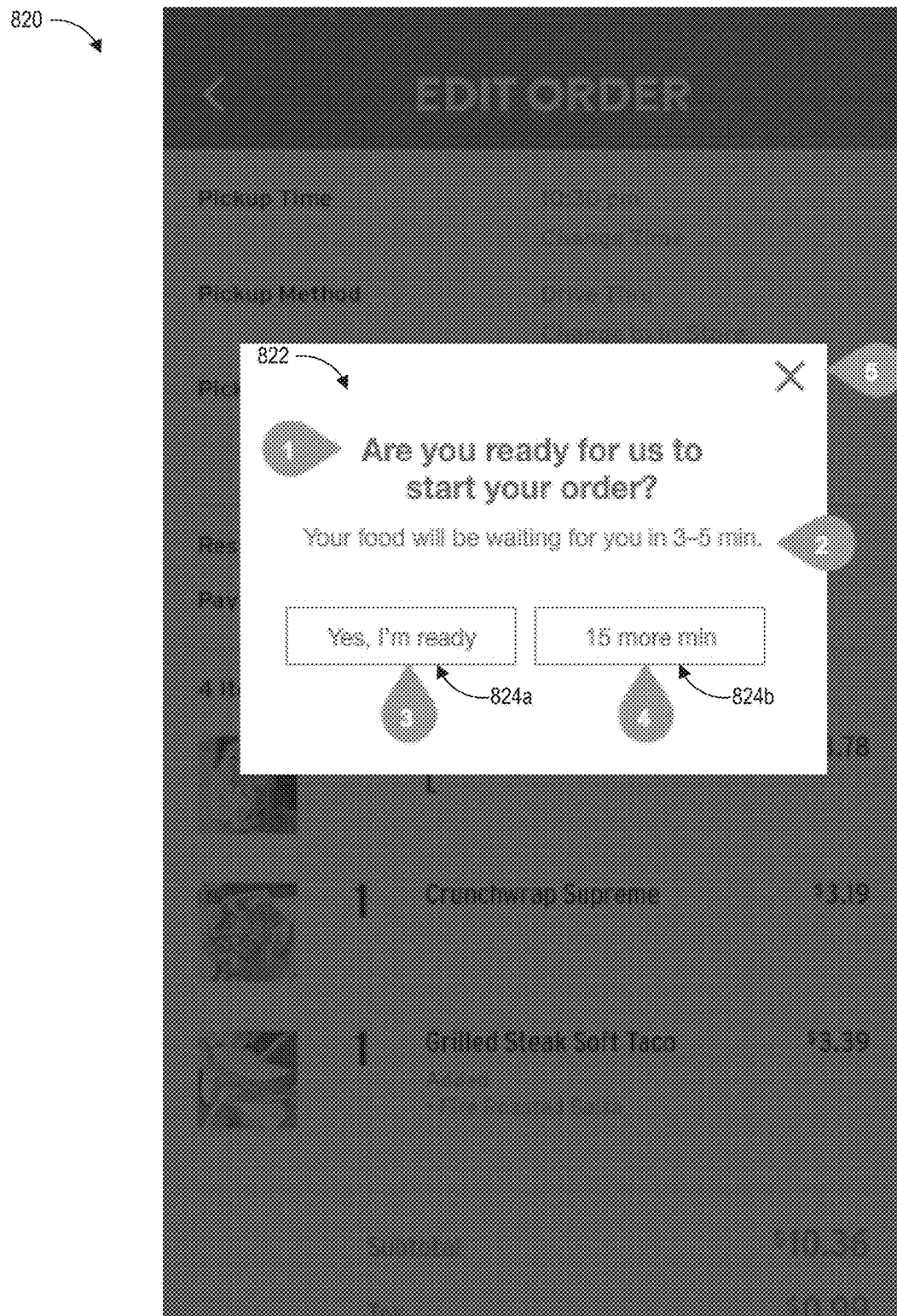

FIGS. 8A and 8B illustrate example user interfaces for an early check-in of an order. In the example user interface 810 in FIG. 8A, an order can have four states: received, being prepped, being made, and ready. The check-in option may be available during the "received" and "being prepped" stage. The applicable states of an order as well as the availability of the check-in option may be different based on the pickup or payment options. For example, if the pickup option of an order is in store and pickup at a later time, and the user's payment method is online, the applicable states of the order may be the ones shown in FIG. 8A. If the pickup option of an order is in store and pick up now, and the user's payment method is online, the applicable states may not have the "being prepared" state. The order's state can be advanced to "being made" directly from "received". If the pickup option is in-store and the payment method is in store, the order states can include: received, check in at register which indicates that the user needs to check in their order at the store register before it can be made, pickup at counter, and order complete. Lastly, if the pickup option is drive through, the order states can include: received, check in at drive through which indicates that the user needs to check in the order at the drive thru before it can be made, pickup at window, and order complete.

The user can actuate the user interface element 812 to trigger the check-in option. Upon detecting that the user interface element 812 is actuated, the ordering application can present the user interface 820 in FIG. 8B. The user interface 820 shows a prompt 822. The prompt 822 can include an estimate wait time before the order is ready. The prompt 822 can also include the user interface elements 824a and 824b. The user interface element 824a is for confirming that the user is ready to pick up the order. An actuation of the user interface element 824a can cause the computing system 130 to automatically check in the order where the online ordering platform 132 may send a request to the backend processing system 134 to update the order status to checked-in. The backend processing system 134 can also send a message to the restaurant system 137 which can cause the POS system 280 to send the order to the kitchen system 290 and change the order's status to be in the "Being Made" state. If the check-in is unsuccessful, the user may receive an error message. The error message may be generated by the backend processing system 134 and passed to the ordering application via the online ordering platform 132.

The user interface element 824b is for extending the pickup time. For example, when the user interface element 824b is actuated, the pickup time may be automatically extended for 15 minutes and the order can remain in the current state. In some situations, the user may not be able to extend the pickup time, for example, due to the store closing or when a store event (e.g., happy hour or breakfast hour) is ending soon.

Although the examples are illustrated with reference to early check-in which may allow a user to pick up an order before the scheduled time, in some implementations, the user can also postpone the pickup time during the check-in process. The postponement may also be subject to validations, such as, e.g., validations against store hours, price change (e.g., due to discounted price at happy hours), or item's availability (e.g., the end of breakfast hours).

The order may also be automatically checked-in (also referred to as auto check-in). In some embodiments, auto check-in applies only if the pick-up option is pickup in store and the payment option is pay online. As an example of auto check-in, at X+Y minutes before order is due to be picked up, a notification can be sent to the user system 110 reminding the user of the upcoming order. User can choose to snooze the order or delay pickup time for 10 minutes (which may cause auto check-in to be triggered after 10 minutes). In certain implementations, the computing system 130 may not allow the user to snooze the order if snoozing would put the order time past store closing, or would cause some of the items within the order to be unavailable.

At X minutes before the order is due to be picked up, the order will be automatically checked in which will cause it to be sent to the kitchen system 290 for completion. The values of X and Y may be determined based on a variety of factors such as, e.g., order value, order size, prep time, the store activities, etc., alone or in combination. For example, a big order size or a long prep time may cause the X value to be bigger so that the store can have more time to prepare the order. As another example, if the store is busy, the value of X (and/or Y) may be bigger because the store may not be able to start on fulfilling the order immediately upon check-in. In some embodiments, the computing system 130 can send a notification to the user when the order is sent to the kitchen system 290, or when the auto check-in fails.

Figure 9:
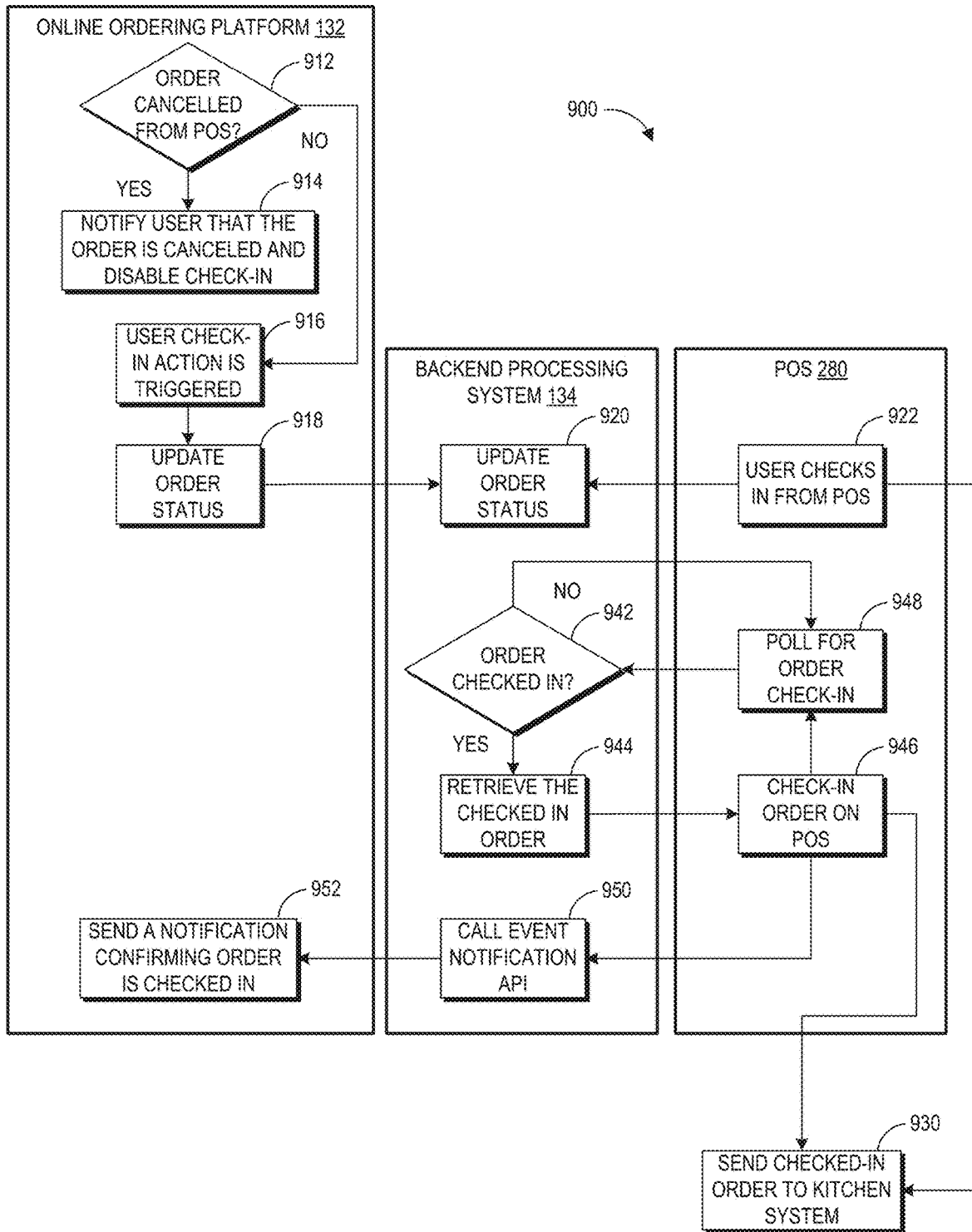
FIG. 9 illustrates an example process of checking in an order.

FIG. 9 illustrates an example process of order check-in. The example process 900 may involve the online ordering platform 132, the backend processing system 134, the POS system 280, and the kitchen system 290 (not shown).

At block 912, the online ordering platform 132 can determine whether the order is cancelled from the POS. When the POS cancels an order, the POS can communicate the order status to the backend processing system 134 which can update the orders status to cancel. The backend processing system 134 can synchronize with the online ordering platform 132 which can cause the online ordering platform 132 to also update the order status to cancel.

If the order is cancelled from the POS, at block 914, the online ordering platform 132 can notify the user that the order is canceled and can disable check-in for the order.

If the order is not cancelled from the POS, the online ordering platform 132 can monitor the user's activity on the ordering application and determine, at block 916 whether a user check-in action is triggered. The check-in action can be triggered by the user on a mobile application or through a website of the restaurant. Once the check-in action is triggered, the computing system 130 can update the order status, optionally process payment, and send the order to the kitchen system 290 to start preparation of the order.

At block 918, the online ordering platform 132 can update the order status to be checked-in. In some implementations, once the check-in action is triggered, the online ordering platform 132 can automatically transition the order's state to "being made". Once check-in action is triggered, the online ordering platform 132 can communicate with a payment system (not shown) to determine whether a payment has been made. For example, the online ordering platform 132 can communicate with the payment system to determine whether the card used for the order has been charged. The online ordering platform may update the order status (e.g., to "being made" or "checked-in") after the payment has been made and after the user has checked-in.

At block 920, the online ordering platform 132 can synchronize with the backend processing system 134 to update the order status to checked-in. In addition to or in alternative to check in online, the user can also check in the order at the POS 280 as shown in block 922. If the user checks in at the POS, the POS 280 can communicate a message to the backend processing system 134 to indicate that the order status has been updated to checked-in at POS. The backend processing system 134 can accordingly update the order status to checked-in at the block 920. In some implementations, after the user checks in at the POS 280, the backend processing system 134 can synchronize with the online ordering platform 132 which causes the online ordering platform 132 to update the order status to checked-in on the mobile app or browser. As a result, the user can see that the order status is changed to checked-in on the ordering application even though the user checked in the order at the POS 280.

At block 948, the POS system can poll for checked in orders by communicating with the backend processing system 134. Upon receive a request from the POS system 280, the backend processing system 134, can check, at the block 942, whether there are any checked in order. If there are no checked-in orders, the process 942 moves back to block 948 where the POS system continuously poll for checked in orders. If there are one or more checked-in orders, the process 900 proceeds to the block 944 where the backend processing system 134 can retrieve the checked in order. The backend processing system 134 can communicate the order information associated with the checked-in order to the POS 280 where the POS system 280 can check the order in at the restaurant side.

At block 950, the POS 280 can communicate to the backend process system 134 that the order has checked-in at the POS 280. The backend processing system 134 can call an event notification API which can cause, at block 952 a notification to be sent to the client system 110 to notify the client system that the order has checked in. For example, the backend processing system 134 can call the notifications component 254 shown in FIG. 2A for sending the notification to the client system 110.

Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, or combinations of the same or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for rapid reordering comprising:
 a mobile device comprising:
   a non-transitory physical computer storage that stores executable instructions corresponding to an ordering application; and
   a first hardware processor programmed to execute the instructions so as to:
   determine that a user is authenticated by the ordering application;
   detect a first actuation of a mobile device triggered by actuating a button on the mobile device and based on an operating system of the mobile device, wherein the first actuation comprises a 3D touch or a long press on a display of the mobile device;
   cause the mobile device to present an option for a rapid reorder of an item in response to the detection of the first actuation of the mobile device and in response to the determination that the user is authenticated;
   detect a second actuation of the mobile device, wherein the second actuation indicates a selection of the option for the rapid reorder;
   in response to the detection of the second actuation,
   activate the ordering application from a background process,
   access order information associated with the item, and
   cause the mobile device to present a checkout user interface of the ordering application, wherein the checkout user interface comprises the order information associated with the item; and
   communicate first data to a remote computing system, the first data comprising a request to create an order object by the remote computing system based at least partly on the order information; and the remote computing system comprising a second hardware processor configured to:

apply a validation rule to the first data and the order object, wherein the validation rule is associated with at least one of food item availability, a store location, or store hours, wherein application of the validation rule results in output;

detect, from the output, an error with the first data and the order object;

determine that the error is recoverable;

automatically generate an updated order object, wherein automatically generating the updated order object further comprises:

generating, from the first data, first modified data to address the error; and including the first modified data in the updated order object; and make the updated order object available to a point of sale system.

2. The system of claim 1, wherein the validation rule is configured to result in the output where a pickup method from the order information is no longer valid, and wherein generating the first modified data further comprises selecting an alternate pickup method.

3. The system of claim 2, wherein the pickup method comprises a drive-through pickup and the alternate pickup method comprises an in-store pickup.

4. The system of claim 1, wherein the first hardware processor is further programmed to:

receive an indication that the user selected a check-in action; and in response to receiving the indication, update a status associated with the order object from a first status to a second status.

5. The system of claim 1, wherein the first hardware processor is further programmed to:

cause the mobile device to present a user interface for enabling and configuring a second rapid reorder for a second item.

6. The system of claim 1, wherein the order object comprises an order that is on a past order list or a favorite order list.

7. A method for rapid reordering comprising:

under control of a hardware processor, detecting a first actuation of a mobile device triggered by actuating a button on the mobile device and based on an operating system of the mobile device, wherein the first actuation comprises a 3D touch or a long press on a display of the mobile device;

causing the mobile device to present an option for a rapid reorder of an item in response to the first actuation of the mobile device;

detecting a second actuation of the mobile device, wherein the second actuation indicates a selection of the option for the rapid reorder;

activating an ordering application on the mobile device;

determining that the rapid reorder is configured for the item;

in response to the determination that the rapid reorder is configured for the item;

accessing order information associated with the item;

causing the mobile device to present a checkout user interface of the ordering application, wherein the checkout user interface comprises the order information associated with the item; and communicating first data to a remote computing system, the first data comprising a request to create an order object by the remote computing system based at least partly on the order information;

applying a validation rule to the first data and the order object, wherein the validation rule is associated with at least one of food item availability, a store location, or store hours, wherein application of the validation rule results in output;

detecting, from the ouput, an error with the first data and the order object;

determining that the error is recoverable;

automatically generating an updated order object, wherein automatically generating the updated order object further comprises:

generating, from the first data, first modified data to address the error; and including the first modified data in the updated order object; and making the updated order object available to a point of sale system.

8. The method of claim 7, further comprising:

determining that a user is authenticated by the ordering application; and wherein the option for rapid reorder is presented in response to the determination that the user is authenticated by the ordering application and the detection of the first actuation of the mobile device.

9. The method of claim 7, further comprising:

causing the mobile device to present a user interface for enabling and configuring a second rapid reorder for a second item.

10. The method of claim 7, wherein the order information comprises a customization of the item.

11. The method of claim 7, wherein the order information comprises a pickup location of the item.

12. The method of claim 7, further comprising:

receiving an indication that a user selected a check-in action; and in response to receiving the indication, updating a status associated with the request to create the order object.

13. The method of claim 7, wherein the order object comprises a past order or a favorite order.

14. A system for rapid reordering comprising:

a mobile device comprising:

a non-transitory physical computer storage that stores executable instructions corresponding to an ordering application; and a first hardware processor programmed to execute the instructions so as to:

detect a first actuation of a mobile device triggered by actuating a button on the mobile device and based on an operating system of the mobile device wherein the first actuation comprises a 3D touch or a long press on a display of the mobile device;

cause the mobile device to present an option for a rapid reorder of an item in response to the first actuation of the mobile device;

detect a second actuation of the mobile device, wherein the second actuation indicates a selection of the option for the rapid reorder;

access order information associated with the item;

cause the mobile device to present a checkout user interface of the ordering application, wherein the checkout user interface comprises the order information associated with the item; and communicate first data to a remote computing system, the first data comprising a request to create an order object by the remote computing system based at least partly on the order information; and the remote computing system comprising a second hardware processor configured to:

apply a validation rule to the first data and the order object, wherein the validation rule is associated with at least one of food item availability, a store location, or store hours, wherein application of the validation rule results in output;

detect, from the output, an error with the first data and the order object;

determine that the error is recoverable;

automatically generate an updated order object, wherein automatically generating the updated order object further comprises:

generating, from the first data, first modified data to address the error; and including the first modified data in the updated order object; and make the updated order object available to a point of sale system.

15. The system of claim 14, wherein the first hardware processor is further programmed to:

determine that a user is authenticated by the ordering application; and wherein the option for rapid reorder is presented in response to the determination that the user is authenticated by the ordering application and the detection of the first actuation of the mobile device.

16. The system of claim 14, wherein the first hardware processor is further programmed to:

cause the mobile device to present a user interface for enabling and configuring a second rapid reorder for a second item.

17. The system of claim 14, wherein the order information comprises a customization of the item.

18. The system of claim 14, wherein the order information comprises a pickup location of the item.

19. The system of claim 14, wherein the first hardware processor is further programmed to:

receive an indication that a user selected a check-in action; and update a status associated with the request to create the order object.

20. The system of claim 14, wherein the order object comprises a past order or a favorite order.

* * * * *